United States Patent
Akkarakaran et al.

(10) Patent No.: US 11,570,759 B2
(45) Date of Patent: Jan. 31, 2023

(54) SIDELINK MULTI-USER MULTIPLE INPUT MULTIPLE OUTPUT

(71) Applicant: QUALCOMM Incorporated, San Diego, CA (US)

(72) Inventors: Sony Akkarakaran, Poway, CA (US); Tao Luo, San Diego, CA (US); Jung Ho Ryu, Fort Lee, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 146 days.

(21) Appl. No.: 16/946,870

(22) Filed: Jul. 9, 2020

(65) Prior Publication Data

US 2021/0014834 A1    Jan. 14, 2021

Related U.S. Application Data

(60) Provisional application No. 62/872,554, filed on Jul. 10, 2019.

(51) Int. Cl.
*H04W 72/04* (2009.01)
*H04B 7/0413* (2017.01)
*H04L 5/00* (2006.01)

(52) U.S. Cl.
CPC .......... *H04W 72/04* (2013.01); *H04B 7/0413* (2013.01); *H04L 5/0048* (2013.01)

(58) Field of Classification Search
CPC ... H04W 76/14; H04W 72/042; H04W 72/04; H04W 92/18; H04L 5/0048; H04B 7/0413
See application file for complete search history.

(56) References Cited

U.S. PATENT DOCUMENTS

| | | |
|---|---|---|
| 2017/0019886 A1 | 1/2017 | Patel et al. |
| 2019/0229964 A1* | 7/2019 | Ouchi .................. H04L 5/0051 |
| 2020/0067615 A1* | 2/2020 | Ghanbarinejad .... H04B 17/309 |
| 2020/0077391 A1* | 3/2020 | Choi .................. H04W 72/042 |

FOREIGN PATENT DOCUMENTS

WO    2018012424 A1    1/2018

OTHER PUBLICATIONS

International Search Report and Written Opinion—PCT/US2020/070255—ISA/EPO—dated Oct. 26, 2020.
VIVO: "Physical Layer Structure for NR Sidelink", 3GPP TSG RAN WG1 Meeting #95, 3GPP Draft; R1-1812306, 3rd Generation Partnership Project (3GPP), Mobile Competence Centre ; 650, Route Des Lucioles ; F-06921 Sophia-Antipolis Cedex; France, Spokane, USA, Nov. 12-16, 2018, Nov. 16, 2018 (Nov. 16, 2018), pp. 1-11, XP051478495, Retrieved from the Internet: URL: http://www.3gpp.org/ftp/tsg%5Fran/WG1%5FRL1/TSGR1%5F95/Docs/R1%2D1812306%2Ezip , pp. 1-8.

* cited by examiner

*Primary Examiner* — Rahel Guarino
(74) *Attorney, Agent, or Firm* — Harrity & Harrity, LLP

(57) ABSTRACT

Various aspects of the present disclosure generally relate to wireless communication. In some aspects, a user equipment (UE) may transmit an indication of one or more reception parameters, of the UE, for sidelink communication and downlink communication. The UE may receive, based at least in part on the one or more reception parameters, at least one of one or more sidelink streams or one or more downlink streams. Numerous other aspects are provided.

30 Claims, 12 Drawing Sheets

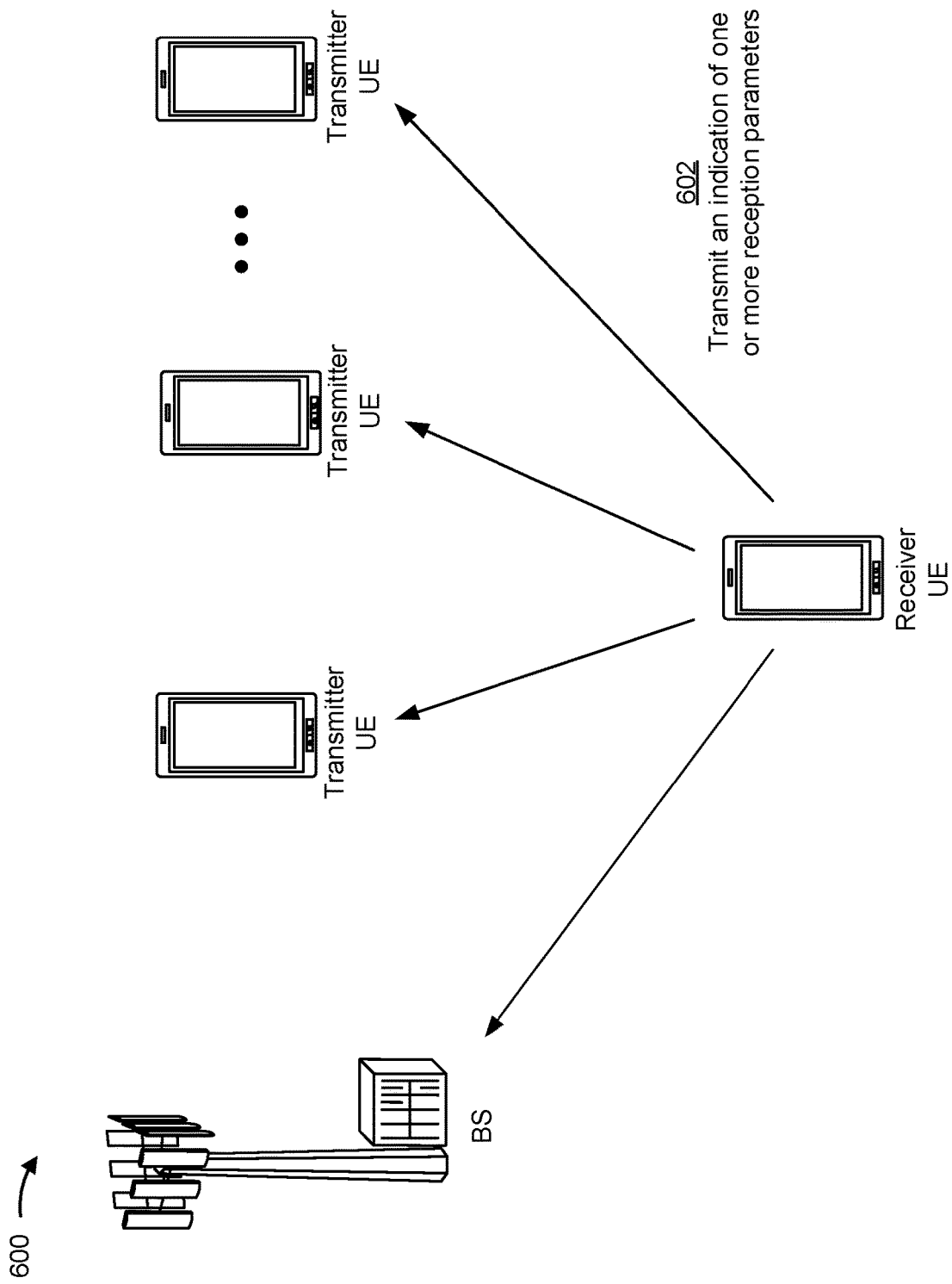

SIDELINK MULTI-USER MULTIPLE INPUT MULTIPLE OUTPUT

CROSS-REFERENCE TO RELATED APPLICATION

This Patent Application claims priority to U.S. Provisional Patent Application No. 62/872,554, filed on Jul. 10, 2019, entitled "SIDELINK MULTI-USER MULTIPLE INPUT MULTIPLE OUTPUT," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for sidelink multi-user multiple input multiple output (MU-MIMO).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include transmitting an indication of one or more multi-user multiple input multiple output (MU-MIMO) reception parameters, of the UE, for sidelink communication and downlink communication; and receiving, based at least in part on the one or more reception parameters, at least one of one or more sidelink streams or one or more downlink streams.

In some aspects, a method of wireless communication, performed by a UE, may include identifying one or more sidelink streams that are based at least in part on one or more transmission parameters of the UE for sidelink communication and uplink communication; and transmitting at least one of the one or more sidelink streams or one or more uplink streams.

In some aspects, a UE for wireless communication may include memory and one or more processors operatively coupled to the memory. The memory and the one or more processors may be configured to transmit an indication of one or more reception parameters, of the UE, for sidelink communication and downlink communication; and receive, based at least in part on the one or more reception parameters, at least one of one or more sidelink streams or one or more downlink streams.

In some aspects, a UE for wireless communication may include memory and one or more processors operatively coupled to the memory. The memory and the one or more processors may be configured to identify one or more sidelink streams that are based at least in part on one or more transmission parameters of the UE for sidelink communication and uplink communication; and transmit at least one of the one or more sidelink streams or one or more uplink streams.

In some aspects, a non-transitory computer-readable medium may store one or more instructions for wireless communication. The one or more instructions, when executed by one or more processors of a UE, may cause the one or more processors to transmit an indication of one or more reception parameters, of the UE, for sidelink communication and downlink communication; and receive, based at least in part on the one or more reception parameters, at least one of one or more sidelink streams or one or more downlink streams.

In some aspects, a non-transitory computer-readable medium may store one or more instructions for wireless communication. The one or more instructions, when executed by one or more processors of a UE, may cause the one or more processors to identify one or more sidelink streams that are based at least in part on one or more transmission parameters of the UE for sidelink communication and uplink communication; and transmit at least one of the one or more sidelink streams or one or more uplink streams.

In some aspects, an apparatus for wireless communication may include means for transmitting an indication of one or more reception parameters, of the apparatus, for sidelink communication and downlink communication; and means for receiving, based at least in part on the one or more reception parameters, at least one of one or more sidelink streams or one or more downlink streams.

In some aspects, an apparatus for wireless communication may include means for identifying one or more sidelink streams that are based at least in part on one or more transmission parameters of the apparatus for sidelink communication and uplink communication; and means for transmitting at least one of the one or more sidelink streams or one or more uplink streams.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
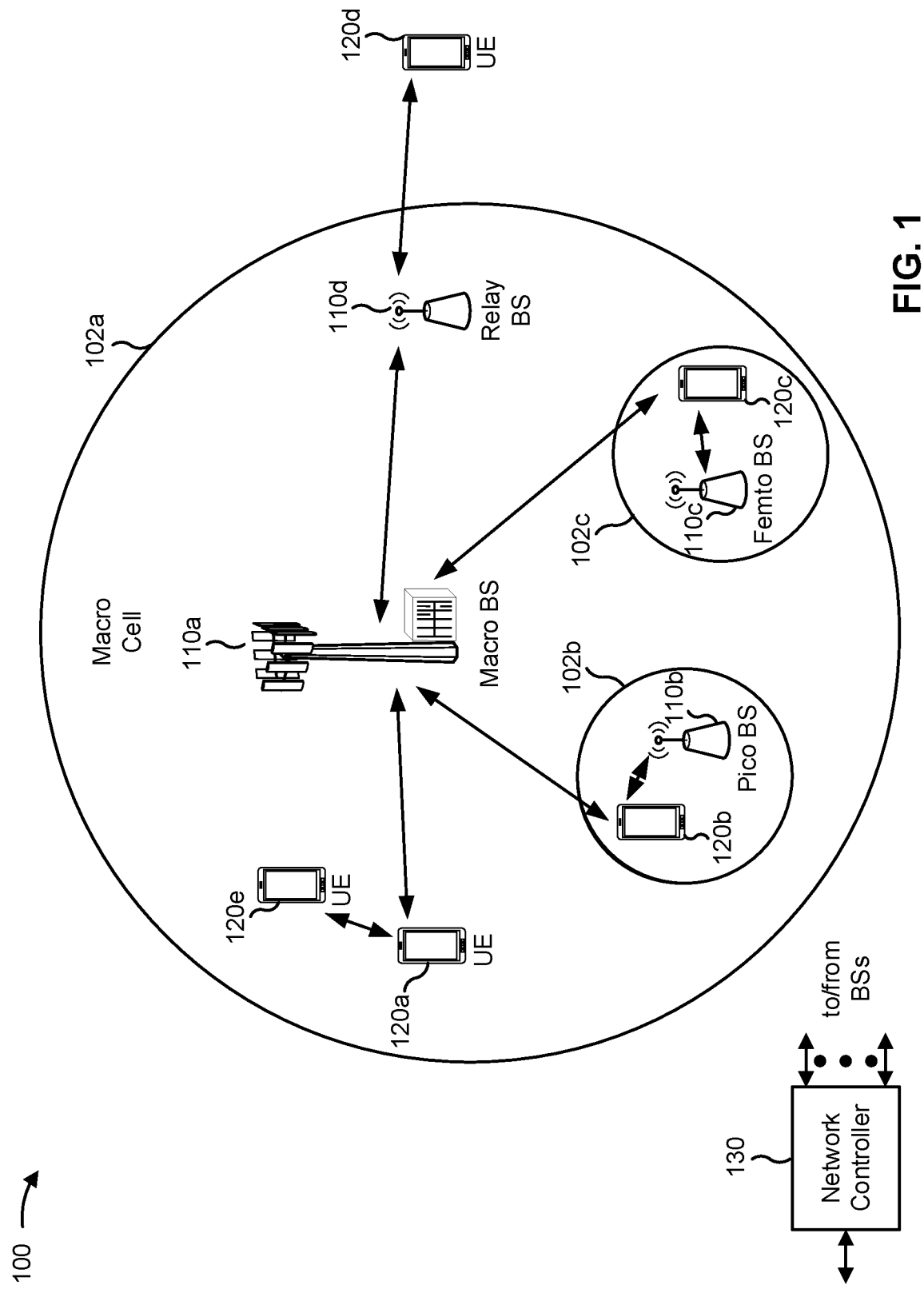
FIG. 1 is a block diagram illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

In some aspects, a BS 110 and/or a UE 120 may be capable of communicating (e.g., transmitting and/or receiving) using millimeter waves (mmW). To improve millimeter wave communication, the BS 110 and/or the UE 120 may use beamforming to focus a directional millimeter wave beam. The base station 110 and/or the UE 120 may use such beams to establish initial millimeter wave links, for control communications, for data communications (e.g., steady state data rate communications, peak data rate communications, and/or the like), and/or the like. Beamforming may be achieved using an antenna array by combining antenna elements in the antenna array such that signals at particular angles experience constructive interference while signals at other angles experience destructive interference. The base station 110 and/or the UE 120 may use millimeter wave beams to communicate with other devices (e.g., via BS-to-UE communication, UE-to-UE communication, BS-to-BS communication, and/or the like).

As indicated above, FIG. 1 is provided as an example. Other examples may differ from what is described with regard to FIG. 1.

Figure 2:
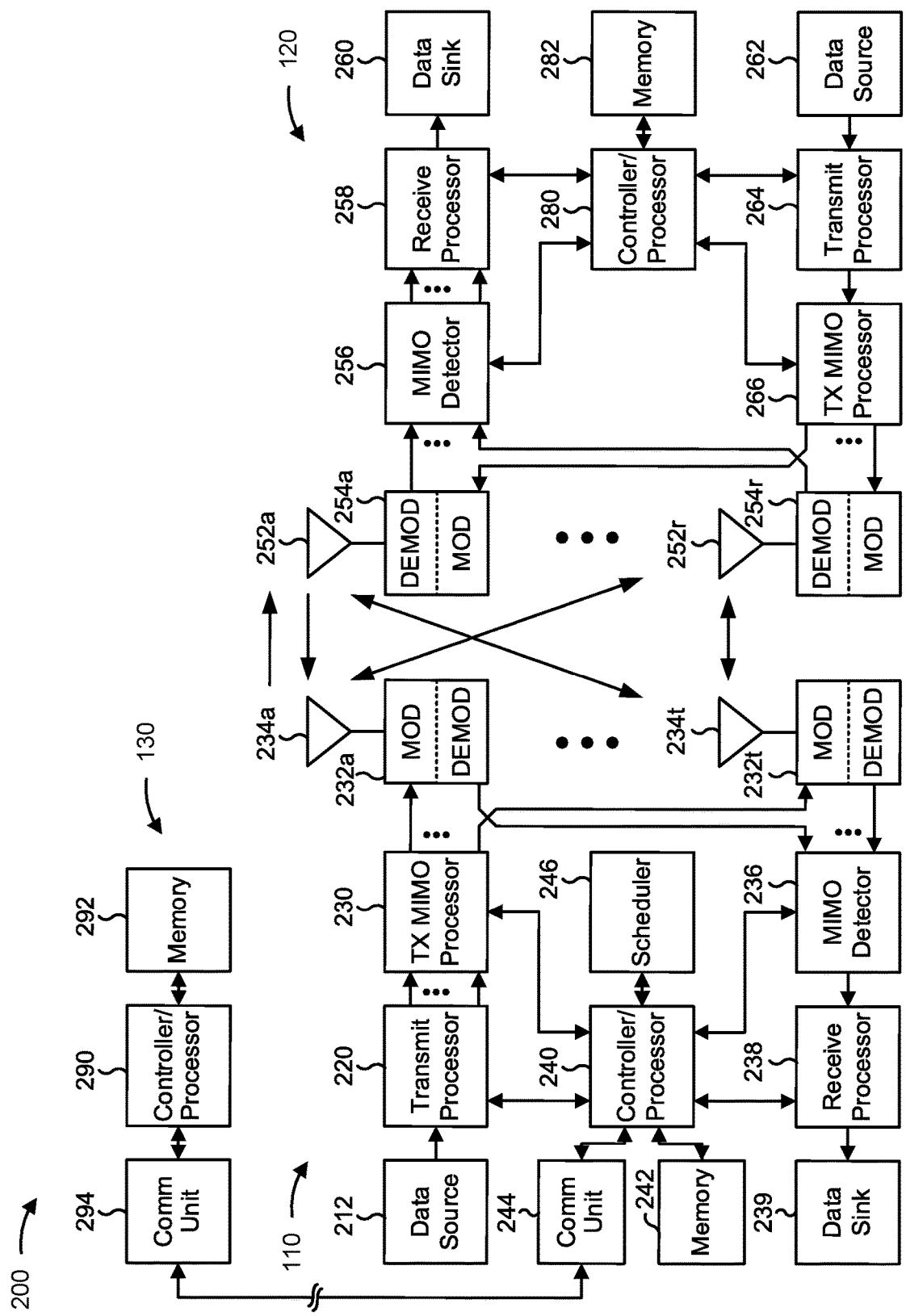
FIG. 2 is a block diagram illustrating an example of a base station (BS) in communication with a user equipment (UE) in a wireless communication network, in accordance with various aspects of the present disclosure.

FIG. 2 is a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with sidelink multi-user MIMO (MU-MIMO), as described in more detail elsewhere herein. For example, controller/processor 240 of base station 110, controller/processor 280 of UE 120, and/or any other component(s) of FIG. 2 may perform or direct operations of, for example, process 800 of FIG. 8, process 900 of FIG. 9, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direction operations of, for example, process 800 of FIG. 8, process 900 of FIG. 9, and/or other processes as described herein. A scheduler 246 may schedule UEs for data transmission on the downlink and/or uplink.

In some aspects, UE 120 may include means for transmitting an indication of one or more reception parameters, of the UE 120, for sidelink communication and downlink communication, means for receiving, based at least in part on the one or more reception parameters, at least one of one or more sidelink streams or one or more downlink streams, and/or the like. In some aspects, UE 120 may include means for identifying one or more sidelink streams based at least in part on one or more transmission parameters of the UE for sidelink communication and uplink communication, means for transmitting at least one of the one or more sidelink streams or one or more uplink streams, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

As indicated above, FIG. 2 is provided as an example. Other examples may differ from what is described with regard to FIG. 2.

Figure 3:
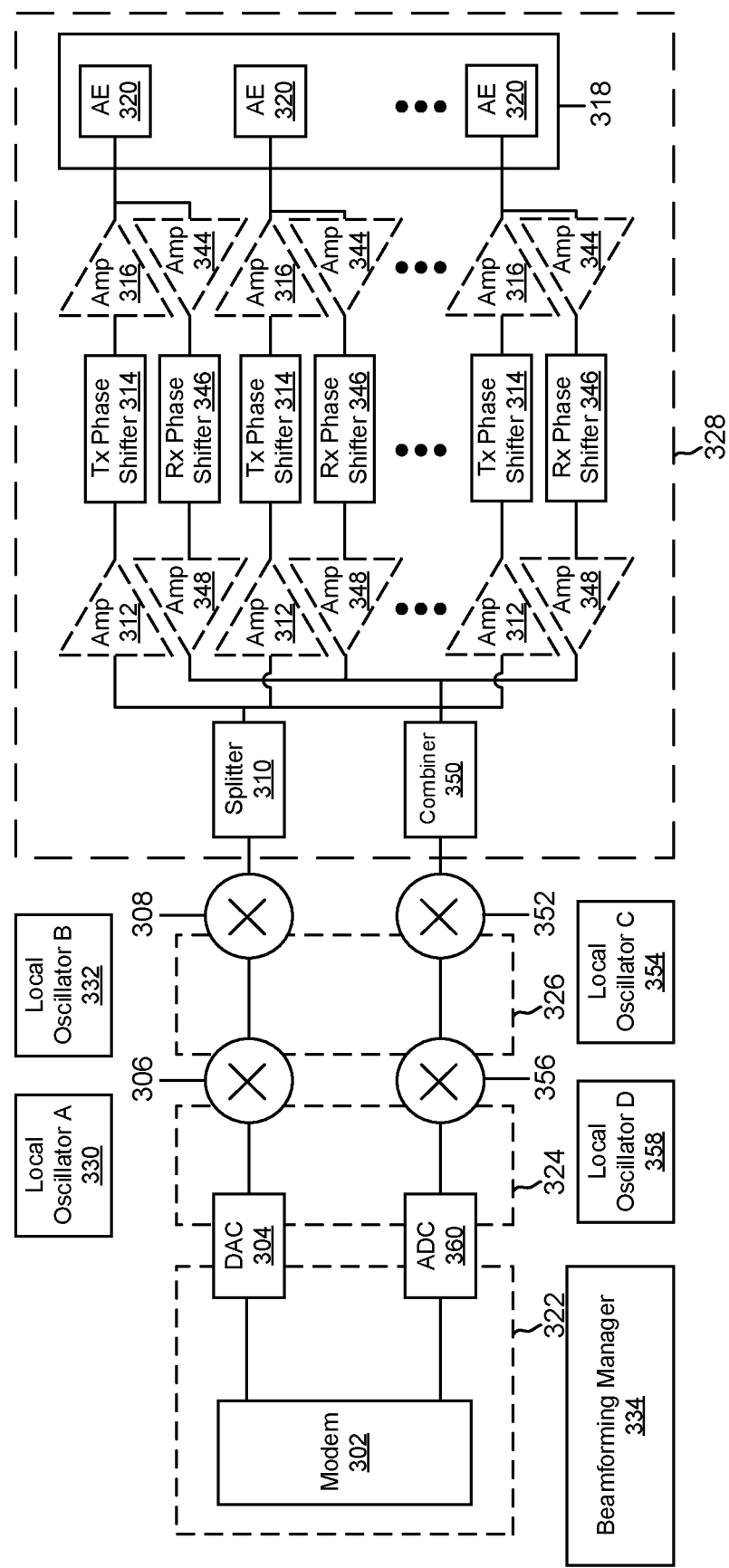
FIG. 3 is a diagram illustrating example hardware components of a wireless communication device, such as a BS or a UE, in accordance with various aspects of the disclosure.

FIG. 3 is a diagram conceptually illustrating example hardware components of a wireless communication device, such as a BS 110 or a UE 120, in accordance with various aspects of the disclosure. The illustrated components may include those that may be used for antenna element selection, for beamforming for transmission and/or reception of wireless signals, for transmission and/or reception, and/or the like. There are numerous architectures for antenna element selection and implementing phase shifting, only one example of which is illustrated here. An architecture 300 may include a modem (modulator/demodulator) 302. The architecture 300 may include a digital to analog converter (DAC) 304, a first mixer 306, a second mixer 308, and/or a splitter 310 for transmission. The architecture 300 may include a plurality of first amplifiers 312, a plurality of transmit phase shifters 314 (shown as Tx Phase Shifters 314), a plurality of second amplifiers 316, and/or an antenna array 318 that includes a plurality of antenna elements (AEs) 320 (which may also be referred to as an antenna panel). The architecture 300 also includes a local oscillator A 330 and a local oscillator B 332 for transmission. The architecture 300 may include a transmit chain and a receive chain. The transmit chain of the architecture 300 may include the components 304, 306, 308, 310, 312, 314, 316, 318, 320, 330, and/or 332 (or any subset of these components). The receive chain of the architecture 300 may include the modem 302, at least some of the antenna elements 320 of the antenna array 318, a plurality of third amplifiers 344, a plurality of receive phase shifters (Rx Phase Shifters) 346, a plurality of fourth amplifiers 348, a combiner 350, a third mixer 352, a local oscillator C 354, a fourth mixer 356, a local oscillator D 358, and/or an analog to digital converter (ADC) 360. In some aspects, a component may be included in both the receive chain and the transmit chain. The operation of the transmit chain and the receive chain are described below.

Transmission lines or other waveguides, wires, traces, or the like are shown connecting the various components to illustrate how signals to be transmitted may travel between components of the architecture 300. Boxes 322, 324, 326, and 328 indicate regions in the architecture 300 in which different types of signals travel or are processed. Specifically, box 322 indicates a region in which digital baseband signals travel or are processed, box 324 indicates a region in which analog baseband signals travel or are processed, box 326 indicates a region in which analog intermediate frequency (IF) signals travel or are processed, and box 328 indicates a region in which analog radio frequency (RF) signals travel or are processed.

Each of the antenna elements 320 may include one or more sub-elements (not shown) for radiating (e.g., transmitting) or receiving RF signals. For example, a single antenna element 320 may include a first sub-element cross-polarized with a second sub-element that can be used to independently transmit or receive cross-polarized signals. The antenna elements 320 may include patch antennas or other types of antennas arranged in a linear, two dimensional, or other pattern. A spacing between antenna elements 320 may be such that signals with a desired wavelength transmitted or received separately by the antenna elements 320 may interact or interfere with each other (e.g., to form a desired beam). For example, given an expected range of wavelengths or frequencies, the spacing may provide a quarter wavelength, half wavelength, or other fraction of a wavelength of spacing between neighboring antenna elements 320 to allow for interaction or interference of signals transmitted or received by the separate antenna elements 320 within that expected range.

The modem 302 processes and generates digital baseband signals and may also control operation of the DAC 304, first mixer 306, second mixer 308, splitter 310, first amplifiers 312, transmit phase shifters 314, and/or the second amplifiers 316 to transmit signals via one or more or all of the antenna elements 320. In some aspects, the modem 302 controls operation of the third amplifiers 344, receive phase shifters 346, fourth amplifiers 348, combiner 350, third mixer 352, fourth mixer 356, and/or ADC 360 to receive signals via one or more of the antenna elements 320. In some aspects, the modem 302 may process signals and control operation in accordance with a communication standard such as a wireless standard discussed herein.

The DAC 304 may convert digital baseband signals received from the modem 302 (and that are to be transmitted) into analog baseband signals. The first mixer 306 may upconvert analog baseband signals to analog intermediate frequency (IF) signals within an IF using the local oscillator A 330. For example, the first mixer 306 may mix the signals with an oscillating signal generated by the local oscillator A 330 to "move" the baseband analog signals to the IF. In some aspects, processing or filtering (not shown) may take place at the IF. The second mixer 308 may upconvert the analog IF signals to analog radio frequency (RF) signals using the local oscillator B 332. Similar to the first mixer 306, the second mixer 308 may mix the signals with an oscillating signal generated by the local oscillator B 332 to "move" the IF analog signals to the RF, or to the frequency at which signals will be transmitted or received. The modem 302 and/or the beamforming manager 334 may adjust the frequency of local oscillator A 330 and/or the local oscillator B 332 so that a desired IF and/or RF frequency is produced and used to facilitate processing and transmission of a signal within a desired bandwidth.

In the architecture 300, signals upconverted by the second mixer 308 are split or duplicated into multiple signals by the splitter 310. The splitter 310 in architecture 300 splits the RF signal into a plurality of identical or nearly identical RF signals, as denoted by its presence in box 328. In some aspects, the split may take place with any type of signal including with baseband digital, baseband analog, or IF analog signals. Each of these signals may correspond to an antenna element 320. A signal, of these signals, may travel through and be processed by amplifiers 312, 316, transmit phase shifters 314, and/or other elements corresponding to the respective antenna element 320 to be provided to and transmitted by the corresponding antenna element 320 of the antenna array 318. In some aspects, the splitter 310 may be an active splitter that is connected to a power supply and provides some gain so that RF signals exiting the splitter 310 are at a power level equal to or greater than the signal entering the splitter 310. In some aspects, the splitter 310 is a passive splitter that is not connected to a power supply, and the RF signals exiting the splitter 310 may be at a power level lower than the RF signal entering the splitter 310.

After being split by the splitter 310, the resulting RF signals may enter an amplifier, such as a first amplifier 312, or a transmit phase shifter 314 corresponding to an antenna element 320. The first and second amplifiers 312, 316 are illustrated with dashed lines because one or both of them might not be included in some aspects. In some aspects, both the first amplifier 312 and second amplifier 314 are present. In some aspects, neither the first amplifier 312 nor the second amplifier 314 is present. In some aspects, one of the two amplifiers 312, 314 is present and not the other. By way of example, if the splitter 310 is an active splitter, the first amplifier 312 may not be used. By way of further example, if the transmit phase shifter 314 is an active phase shifter that can provide a gain, the second amplifier 316 might not be used. The amplifiers 312, 316 may provide a desired level of positive or negative gain. A positive gain (positive dB) may be used to increase an amplitude of a signal for radiation by a specific antenna element 320. A negative gain (negative dB) may be used to decrease an amplitude and/or suppress radiation of the signal by a specific antenna element. Each of the amplifiers 312, 316 may be controlled independently (e.g., by the modem 302 or beamforming manager 334) to provide independent control of the gain for each antenna element 320. For example, the modem 302 and/or the beamforming manager 334 may have at least one control line connected to one or more of the splitter 310, first amplifiers 312, transmit phase shifters 314, and/or second amplifiers 316. The at least one control line may be used to configure a gain to provide a desired amount of gain for each component and thus each antenna element 320.

The transmit phase shifter 314 may provide a configurable phase shift or phase offset to a corresponding RF signal to be transmitted. The transmit phase shifter 314 may be a passive phase shifter (e.g., not directly connected to a power supply). Passive phase shifters may introduce some insertion loss. In such a case, the second amplifier 316 may boost the signal to compensate for the insertion loss. The transmit phase shifter 314 may be an active phase shifter connected to a power supply such that the active phase shifter provides some amount of gain or prevents insertion loss. The settings of each of the transmit phase shifters 314 may be independent, meaning that each transmit phase shifter 314 can be set to provide a desired amount of phase shift, or the same amount of phase shift, or some other configuration. The modem 302 and/or the beamforming manager 334 may have at least one control line connected to each of the transmit phase shifters 314. The at least one control line may be used to configure the transmit phase shifters 314 to provide desired amounts of phase shift or phase offset between antenna elements 320.

The receive chain may operate in a similar, but opposite manner to the transmit chain. For example, the antenna elements 320 may receive RF signals. The receive phase shifter 346 may provide a configurable phase shift or phase offset to an RF signal received on a corresponding antenna element 320. The receive phase shifter 446 may be an active phase shifter or a passive phase shifter, as described in more detail above. The third amplifier 344 may attenuate or amplify the RF signal (e.g., when the receive phase shifter is a passive phase shifter). The fourth amplifier 348 may attenuate or amplify the RF signal (e.g., to an amplitude appropriate for the combiner 350). Each of the amplifiers 344, 348 may be controlled independently (e.g., by the modem 302 or beamforming manager 334) to provide independent control of the gain for each RF signal received on a corresponding antenna element 320. For example, the modem 302 and/or the beamforming manager 334 may have at least one control line connected to one or more of the combiner 350, third amplifiers 344, receive phase shifters 346, and/or fourth amplifiers 348. The at least one control line may be used to configure a gain to provide a desired amount of gain (e.g., positive or negative gain) for each component and thus each antenna element 320. The third and fourth amplifiers 344, 348 are illustrated with dashed lines because one or both of them might not be included in the architecture 300.

Collectively, the third amplifiers 344, the receive phase shifter 346, and/or the amplifier 348 may provide for respective RF signals, which may have different amplitudes, phases, and/or the like at the antenna elements 320, to be homogenized in the phase and/or amplitude dimensions for the combiner 350 and/or intermediate or baseband processing.

After phase shifting is performed at the receive phase shifters 346, the combiner 350 combines the RF signals into a combined RF signal, as denoted by its presence in box 328. In some aspects, the split may take place with any type of signal including with baseband digital, baseband analog, or IF analog signals. In some aspects, the combiner 350 may be an active combiner that provides some attenuation so that the RF signal exiting the combiner 350 is at a power level appropriate for down-conversion. In some aspects, the combiner 350 is a passive combiner, in which case the fourth amplifiers 348 may provide an appropriate level of attenuation to the respective RF signals.

The third mixer 352 may mix the RF signal with an oscillating signal generated by the local oscillator C 354 to "move" the RF signal to an IF, or to the frequency at which the RF signal will be received. For example, the third mixer may down-convert the analog RF signal to an analog IF signal using the local oscillator C 354. In some aspects, processing or filtering (not shown) may take place in the IF domain. The fourth mixer 356 may down-convert the analog IF signal to an analog baseband signal using the local oscillator D 358. For example, the fourth mixer 356 may mix the IF signal with an oscillating signal generated by the local oscillator D 358 to "move" the IF analog signal to the baseband, thereby generating an analog baseband signal. The ADC 360 may convert analog baseband signals into digital baseband signals. The modem 302 may process the digital baseband signals.

The architecture 300 is given by way of example only to illustrate an architecture for transmitting and/or receiving signals. It should be understood that the architecture 300 and/or one or more portions of the architecture 300 may be repeated multiple times within an architecture to accommodate or provide an arbitrary number of transmit chains, receive chains, antenna elements, and/or antenna panels. Furthermore, numerous alternative architectures are contemplated. For example, although only a single antenna array 318 is shown, two, three, or more antenna arrays may be included in the architecture 300, each with one or more of their own corresponding amplifiers, phase shifters, splitters, combiners, mixers, DACs, ADCs, and/or modems. For example, a single UE may include two, four, or more antenna arrays for transmitting or receiving signals at different physical locations on the UE or in different directions. Furthermore, mixers, splitters, combiners, amplifiers, phase shifters, and other components may be located in different signal type areas (e.g., different ones of the boxes 322, 324, 326, 328) in different implemented architectures. For example, a split or combination of the signal may take place at the analog RF, the analog IF, the analog baseband, or the digital baseband frequencies in different aspects. Similarly, amplification, attenuation, and/or phase shifts may also take place at different frequencies. For example, in some aspects, one or more of the splitter 310, amplifiers 312, 316, or phase shifters 314 may be located between the DAC 304 and the first mixer 306 or between the first mixer 306 and the second mixer 308. In some aspects, one or more of the combiner 350, amplifiers 344, 348, or receive phase shifters 346 may be located between the ADC 360 and the fourth mixer 356 or between the fourth mixer 356 and the third mixer 352. In some aspects, the functions of two or more of the components may be combined into one component. For example, the transmit phase shifters 314 may perform amplification to include or replace the first and/or second amplifiers 312, 316, or the receive phase shifters 346 may perform amplification or attenuation to include or replace the third and/or fourth amplifiers 344, 348. As another example, a phase shift may be implemented by the second mixer 308 or third mixer 352 to obviate a need for a separate transmit phase shifter 314 or receive phase shifter 346. This technique is sometimes called local oscillator (LO) phase shifting. In some aspects of this configuration, there may be a plurality of IF to RF mixers or RF to IF mixers (e.g., one for each antenna element 320) within the second mixer 308 or the third mixer 352. In such cases, the local oscillator B 332 or the local oscillator C 354 would supply different local oscillator signals (e.g., with different phase offsets) to each IF to RF mixer or RF to IF mixer.

The modem 302 and/or the beamforming manager 334 may control one or more of the other components of the architecture 300 to select one or more antenna elements 320 and/or to form beams for transmission or reception of one or more signals. For example, the antenna elements 320 may be individually selected or deselected for transmission or reception of a signal (or signals) by controlling an amplitude of one or more corresponding amplifiers of the architecture 300. Beamforming for transmission includes generation of a beam (sometimes referred to as a transmit beam) using a plurality of signals on different antenna elements 320, where one or more or all of the plurality of signals are shifted in phase relative to each other. The formed beam may carry physical layer or higher layer reference signals or information. As each signal of the plurality of signals is radiated from a respective antenna element 320, the radiated signals interact (e.g., interfere, amplify) with each other to form a resulting transmit beam. The shape (e.g., the amplitude, the width, and/or presence of side lobes) and the direction (e.g., an angle of the beam relative to a surface of the antenna array 318) of the transmit beam can be dynamically controlled by modifying the phase shifts or phase offsets imparted by the transmit phase shifters 314 and amplitudes imparted by the amplifiers 312, 316 of the plurality of signals relative to each other.

Beamforming for reception includes generation of a beam (sometimes referred to as a receive beam) by processing signals on different antenna elements 320 based on respective phase shifts to receive a beam in a particular shape and direction. Similar to a transmit beam, the shape and direction of the receive beam can be controlled by modifying the phase shifts or phase offsets imparted by the receive phase shifters 346 and amplitudes controlled by the amplifiers 344, 348 of the plurality of signals relative to each other. In some aspects, a beam (e.g., a transmit beam or a receive beam) may be shaped or directed to cover multiple clusters (e.g., to cover clusters associated with a set of two or more best beams). In some aspects, multiple beams may be co-phased to cover the multiple clusters.

The beamforming manager 334 may configure transmit beams and/or receive beams of the wireless communication device, as described herein. For example, in operation, the beamforming manager 334 may cause each beam of a plurality of beams to be transmitted in different spatial directions to respective receivers (e.g., UEs or BSs) such that each beam may carry the same communication on the same time-frequency resources and in the same or partially overlapping transmission time interval (TTI) without causing collisions between the beams. Respective demodulation reference signals (DMRSs) for each beam may be transmitted in an orthogonal manner in time, frequency, and/or code-space (e.g., orthogonal cover codes (OCCs) or cyclic shifts may be applied to the respective DMRSs). In some aspects, the beamforming manager 334 may be located partially or fully within one or more other components of the architecture 300. For example, the beamforming manager 334 may be located within the modem 302.

As indicated above, FIG. 3 is provided as an example. Other examples may differ from what is described with regard to FIG. 3.

Figure 4A:
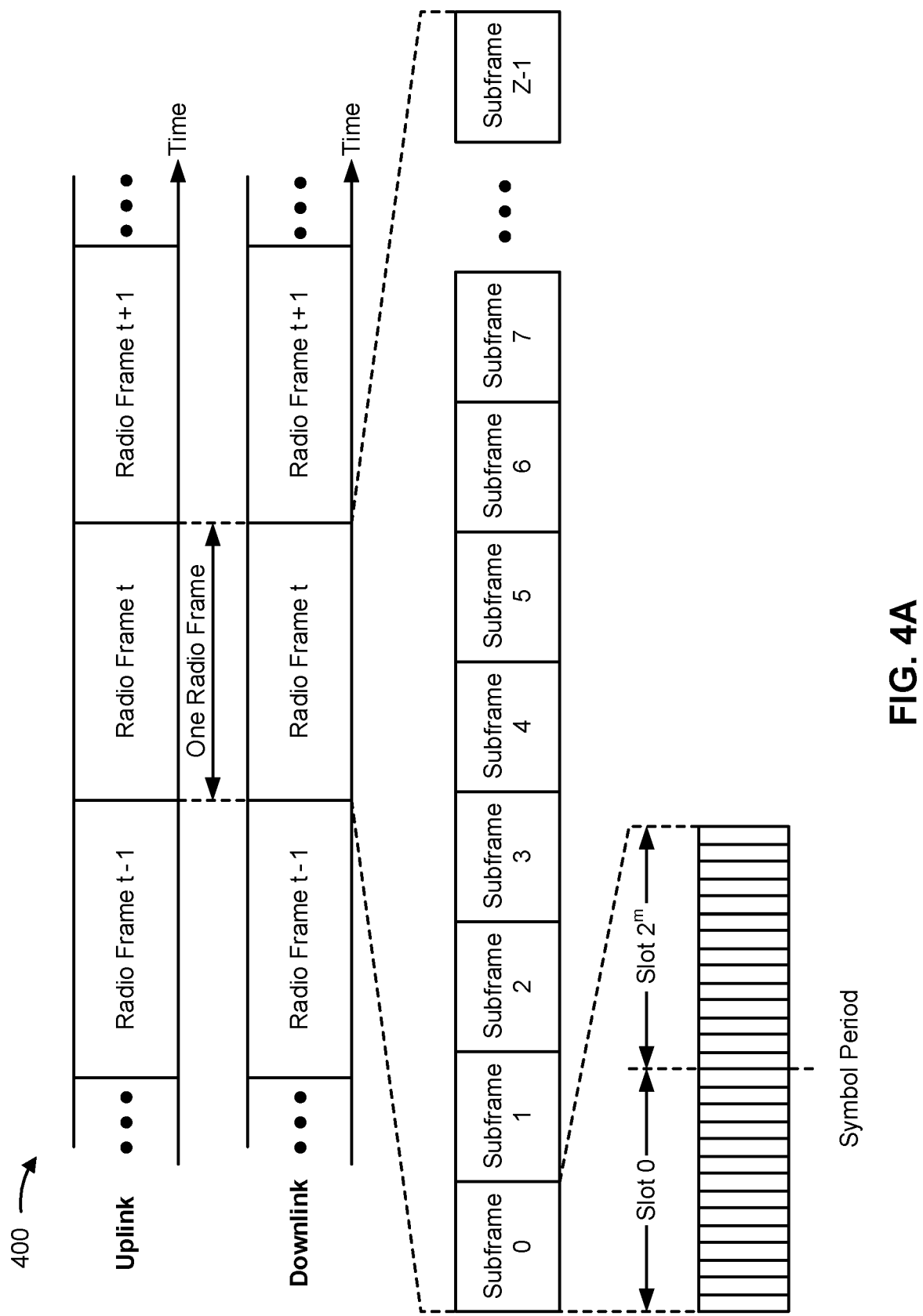
FIG. 4A is a block diagram illustrating an example of a frame structure in a wireless communication network, in accordance with various aspects of the present disclosure.

FIG. 4A shows an example frame structure 400 for frequency division duplexing (FDD) in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., $2^m$ slots per subframe are shown in FIG. 4A, where m is a numerology used for a transmission, such as 0, 1, 2, 3, 4, and/or the like). Each slot may include a set of L symbol periods. For example, each slot may include fourteen symbol periods (e.g., as shown in FIG. 4A), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a scheduling unit for the FDD may be frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 4A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 4B.

Figure 4B:
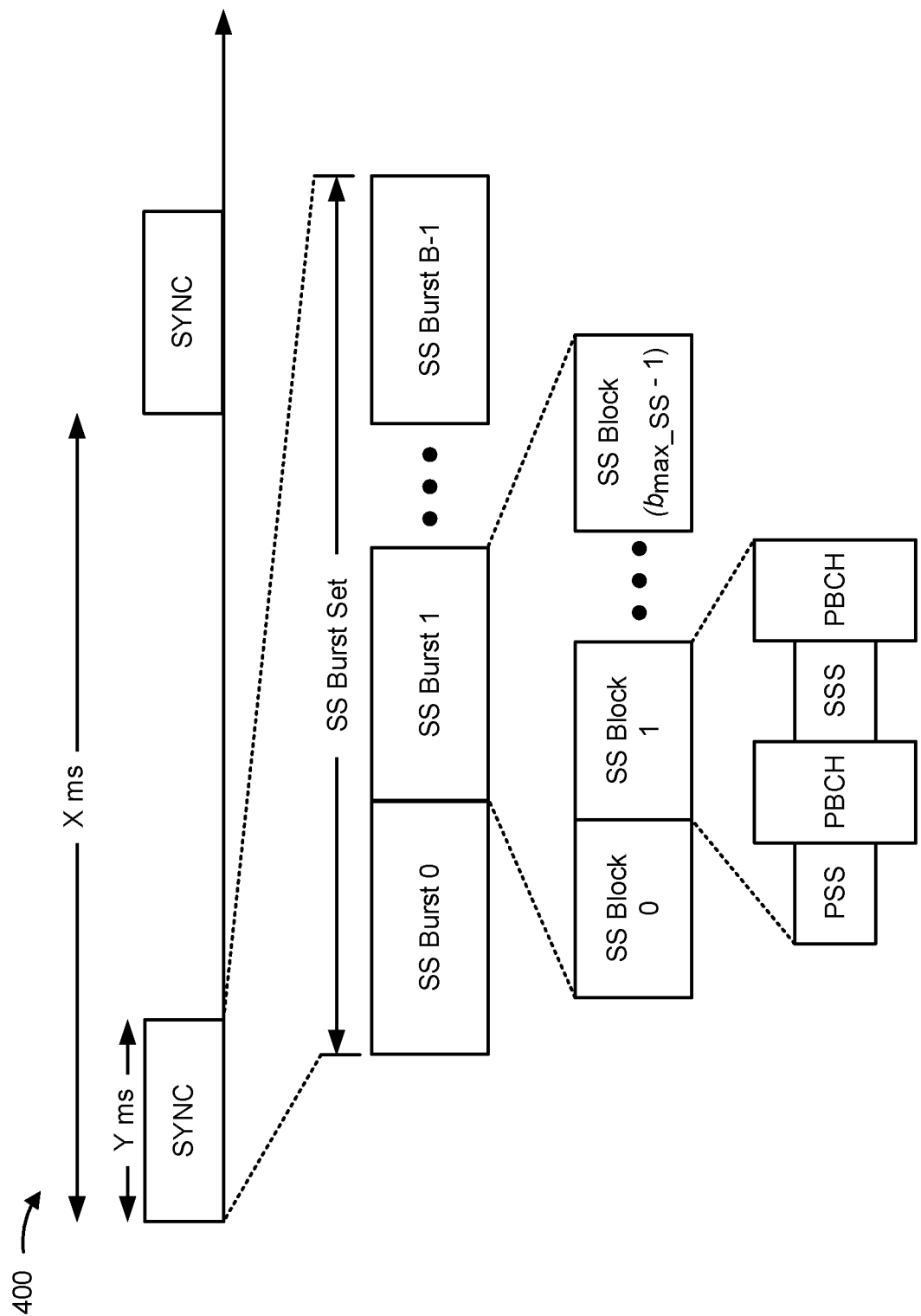
FIG. 4B is a block diagram illustrating an example synchronization communication hierarchy in a wireless communication network, in accordance with various aspects of the present disclosure.

FIG. 4B is a block diagram conceptually illustrating an example SS hierarchy, which is an example of a synchronization communication hierarchy. As shown in FIG. 4B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_SS}$−1), where $b_{max\_SS}$−1 is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 4B.

The SS burst set shown in FIG. 4B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 4B. In some aspects, the symbols of an SS block are non-consecutive. Similarly, in some aspects, one or more SS blocks of the SS burst may be transmitted in consecutive radio resources (e.g., consecutive symbol periods) during one or more slots. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain slots. The base station may transmit control information/data on a physical downlink control channel (PDCCH) in C symbol periods of a slot, where B may be configurable for each slot. The base station may transmit traffic data and/or other data on the PDSCH in the remaining symbol periods of each slot.

As indicated above, FIGS. 4A and 4B are provided as examples. Other examples may differ from what is described with regard to FIGS. 3A and 3B.

Figure 5:
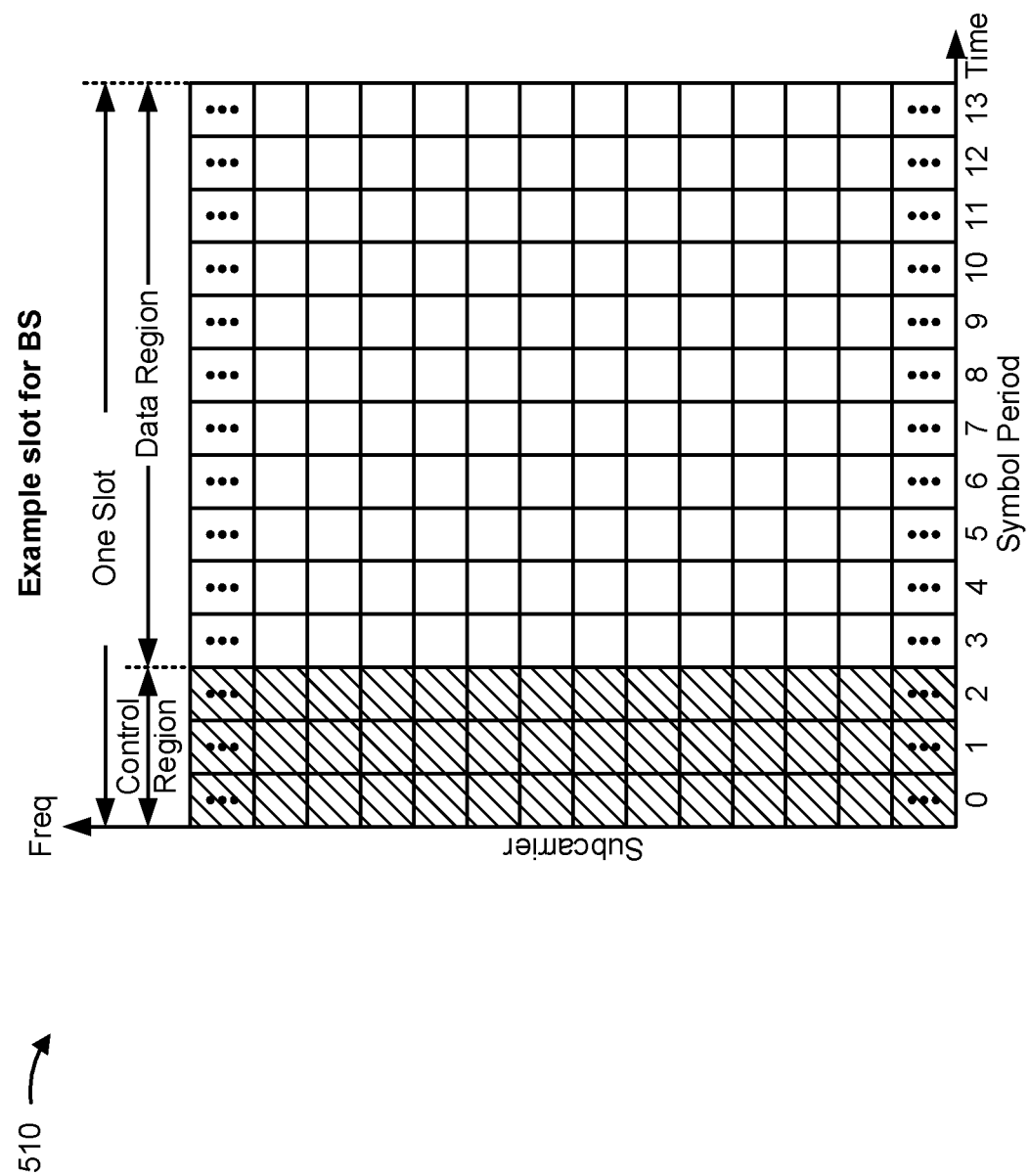
FIG. 5 is a block diagram illustrating an example slot format with a normal cyclic prefix, in accordance with various aspects of the present disclosure.

FIG. 5 shows an example slot format 510 with a normal cyclic prefix. The available time frequency resources may be partitioned into resource blocks. Each resource block may cover a set of subcarriers (e.g., 12 subcarriers) in one slot and may include a number of resource elements. Each resource element may cover one subcarrier in one symbol period (e.g., in time) and may be used to send one modulation symbol, which may be a real or complex value.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include slots that are spaced apart by Q frames. In particular, interlace q may include slots q, q+Q, q+2Q, etc., where q∈{0, . . . , Q−1}.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SNIR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New Radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHz may be supported. NR resource blocks may span 12 sub-carriers with a sub-carrier bandwidth of 60 or 120 kilohertz (kHz) over a 0.1 millisecond (ms) duration. Each radio frame may include 40 slots and may have a length of 10 ms. Consequently, each slot may have a length of 0.25 ms. Each slot may indicate a link direction (e.g., DL or UL) for data transmission and the link direction for each slot may be dynamically switched. Each slot may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such as central units or distributed units.

As indicated above, FIG. 5 is provided as an example. Other examples may differ from what is described with regard to FIG. 5.

In a wireless network, two or more subordinate entities, such as two or more user equipment (UEs) or two or more integrated access and backhaul (IAB) nodes, may communicate with each other using sidelink communications. Real-world applications of such sidelink communications may include public safety, proximity services, UE-to-network relaying, D2D communications, V2X communications, V2V communications, IoE communications, IoT communications, mission-critical mesh, or various other suitable applications. A sidelink communication may refer to a communication that is transmitted from one subordinate entity to another subordinate entity (e.g., UE-to-UE or IAB node-to-IAB node) without relaying that communication through a scheduling entity (e.g., a BS or an IAB donor), even though the scheduling entity may be utilized for scheduling or control purposes. In some examples, a sidelink communication may be transmitted using a licensed frequency spectrum, an unlicensed frequency spectrum (such as an industrial, scientific and medical (ISM) radio band, (e.g., 5 GHz), that is reserved for purposes other than cellular communication such as Wi-Fi).

As indicated above, in some cases, a UE may be capable of using beamforming and/or a plurality of antenna panels (which, in some cases, may be referred to as multi-panel) to transmit and/or receive one or more multi-user multiple input multiple output (MU-MIMO) streams. Each stream may be transmitted and/or received on a respective beam (or set of beams) that is spatially multiplexed with other beams. However, a UE may have particular capabilities associated with simultaneous and/or partially overlapped reception of streams from a BS (which may be referred to as downlink streams) and streams from other UEs (which may be referred to as sidelink streams). Accordingly, if the BS and the other UEs are not aware of the UE's capabilities, the BS and/or the other UEs may transmit streams to the UE in a way that, due to the UE's capabilities, the UE may not support. This may cause the UE to drop certain streams, may cause delays in receiving certain streams, may cause undefined UE behavior, and/or the like.

Moreover, a UE may have particular capabilities associated with simultaneous and/or partially overlapped transmission of streams to a BS (which may be referred to as uplink streams) and sidelink streams to other UEs. Accordingly, if the BS is not aware of the UE's capabilities, the BS may schedule the UE to transmit streams to the BS and/or the other UEs in a way that, due to the UE's capabilities, the UE may not support. This may cause the UE to refrain from transmitting certain streams, may cause delays in transmitting certain streams, may cause undefined UE behavior, and/or the like.

Some aspects described herein provide techniques and apparatuses for sidelink MU-MIMO. In some aspects, a UE may transmit, to a BS and/or one or more other UEs, an indication of one or more reception parameters (e.g., one or more MU-MIMO reception parameters) of the UE. The one or more reception parameters may be based at least in part on the UE's reception capabilities. In this way, the BS and the other UEs are aware of the UE's reception capabilities and may schedule or coordinate the transmission of streams to the UE in a way that is supported by the UE's reception capabilities. This reduces the likelihood that the UE will drop certain streams, reduces delays in receiving certain streams, increases wireless network capacity (e.g., by permitting a plurality of streams to be multiplexed and transmitted to the UE), and/or the like.

Moreover, in some aspects, a UE may configure the transmission of one or more sidelink streams by coordinating the one or more sidelink streams with a BS and/or one or more other UEs based at least in part on one or more transmission parameters (e.g., one or more MU-MIMO transmission parameters) of the UE. The one or more transmission parameters may be based at least in part on the UE's reception capabilities. In this way, the BS and the other UEs are aware of the UE's transmission capabilities such that the BS may schedule or coordinate the transmission of uplink streams, and the UE may configure the transmission of sidelink streams, in a way that is supported by the UE's transmission capabilities. This reduces the likelihood that certain streams will not be transmitted, reduces delays in transmitting certain streams, increases wireless network capacity (e.g., by permitting a plurality of streams to be multiplexed and transmitted by the UE), and/or the like.

Figure 6B:
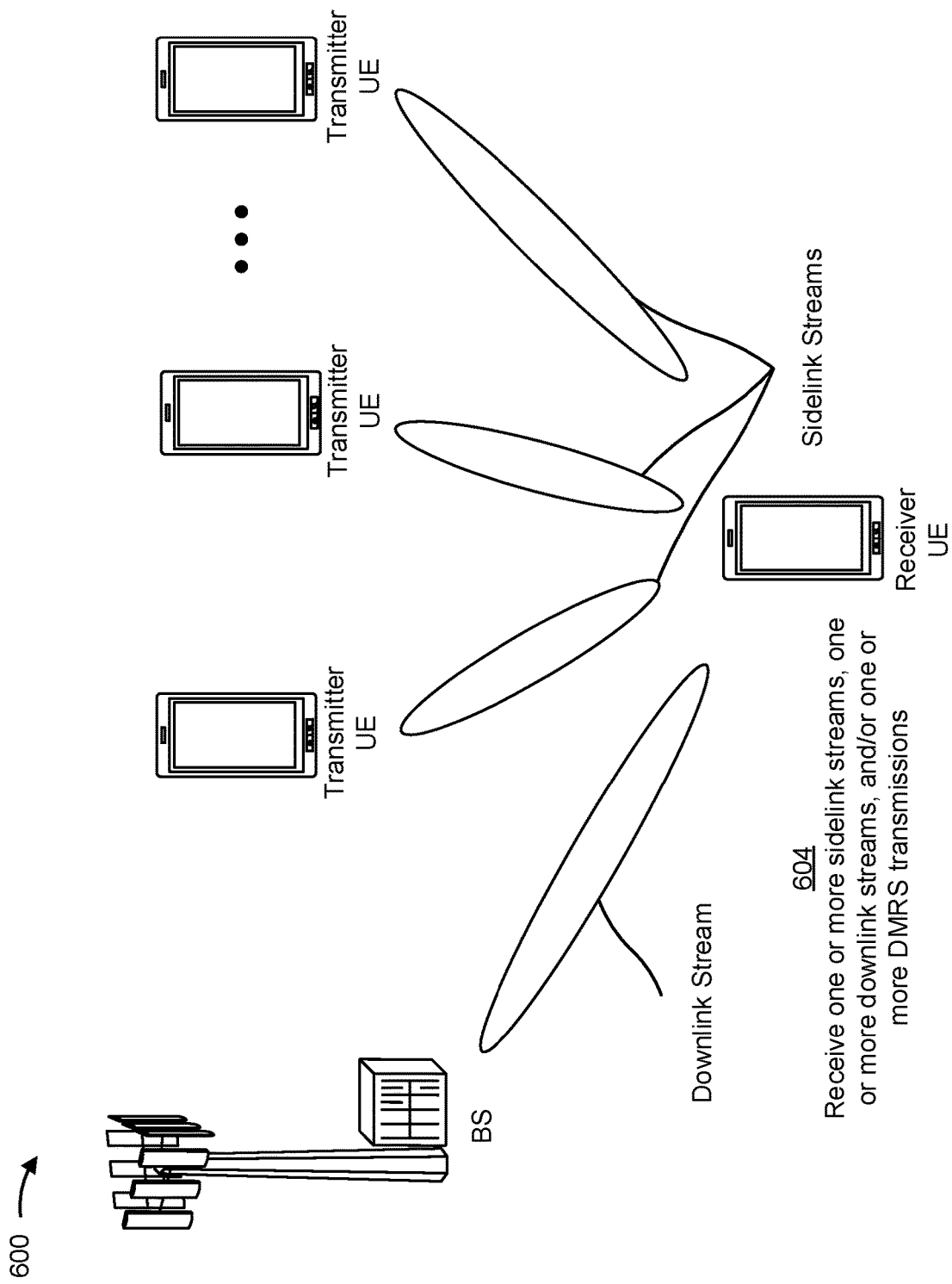
FIGS. 6A-7B are diagrams illustrating examples of sidelink multi-user multiple input multiple output (MU-MIMO), in accordance with various aspects of the present disclosure.

FIGS. 6A and 6B are diagrams illustrating one or more examples 600 of sidelink MU-MIMO, in accordance with various aspects of the present disclosure. As shown in FIGS. 6A and 6B, examples 600 may include sidelink communication on a sidelink between a plurality of UEs (e.g., UEs 120), such as a receiver UE and one or more transmitter UEs, and/or downlink communication on an access link between the receiver UE and a BS (e.g., BS 110). In some aspects, a greater quantity of UEs and/or BSs may be included in examples 600.

In some aspects, the BS and the UEs may be included in a wireless network, such as wireless network 100 and/or another wireless network. In some aspects, the BS may be a serving BS of the receiver UE in the wireless network. The BS and the receiver UE may communicate via an access link, which may be configured with a frame structure (e.g., frame structure 400 and/or another frame structure), a slot format (e.g., slot format 510 and/or another slot format), and/or the like. The access link may include an uplink and a downlink. In some aspects, the UEs may be subordinate entities included in the wireless network and may communicate via a sidelink. In some aspects, the sidelink may be configured with a frame structure (e.g., frame structure 400 and/or another frame structure), a slot format (e.g., slot format 510 and/or another slot format), and/or the like.

In some aspects, the UEs and/or the BS may be capable of performing communications in the wireless network. For example, the BS may be capable of transmitting one or more downlink streams (e.g., one or more downlink MU-MIMO streams) to the receiver UE and/or other UEs, the transmitter UEs may be capable of transmitting sidelink communications to the receiver UE and/or other UEs, the receiver UE may be capable of transmitting one or more uplink streams (e.g., one or more uplink MU-MIMO streams) to the BS and/or other BSs, the receiver UE may be capable of transmitting one or more sidelink streams (e.g., one or more sidelink MU-MIMO streams) to the transmitter UEs and/or other UEs, and/or the like. As another example, the BS may be capable of receiving one or more uplink streams from the receiver UE and/or other UEs, the transmitter UEs may be capable of receiving sidelink communications from the receiver UE and/or other UEs, the receiver UE may be capable of receiving one or more uplink streams from the BS and/or other BSs, the receiver UE may be capable of receiving one or more sidelink streams from the transmitter UEs and/or other UEs, and/or the like.

In some aspects, the receiver UE may be configured with reception capabilities. The reception capabilities of the receiver UE may be based at least in part on a hardware configuration of the receiver UE, the software and/or firmware configuration of the receiver UE, the network configuration or subscription of the receiver UE in the wireless network, and/or the like. The reception capabilities of the receiver UE may determine the receiver UE's capability to receive downlink streams from the BS and/or other BSs, the receiver UE's capability to receive sidelink streams from the transmitter UEs and/or other UEs, and/or the like. Moreover, the MIMO reception capabilities of the receiver UE may determine the receiver UE's capability to receive DMRS transmissions associated with downlink streams and/or sidelink streams received at the receiver UE.

As shown in FIG. 6A, and by reference number 602, to coordinate the reception of downlink streams, sidelink streams, and/or corresponding DMRS transmissions, the receiver UE may transmit an indication of one or more reception parameters of the receiver UE. The one or more reception parameters may be one or more MU-MIMO reception parameters. The one or more reception parameters may be based at least in part on the reception capabilities of the receiver UE. In some aspects, the receiver UE may transmit the indication of the one or more reception parameters to the BS and/or to the transmitter UEs. In this way, the BS and/or the transmitter UEs may coordinate the transmission of the downlink streams, the sidelink streams, and/or the corresponding DMRS transmissions based at least in part on the one or more reception parameters, such that the transmission of the downlink streams, the sidelink streams, and/or the corresponding DMRS transmissions are supported by the reception capabilities of the receiver UE.

In some aspects, if the BS functions as a serving BS for the transmitter UEs, and the transmitter UEs are operating in a scheduled mode (e.g., the BS schedules sidelink transmissions for the transmitter UEs), the BS may coordinate the transmission of the downlink streams, the sidelink streams, and/or the corresponding DMRS transmissions for the BS and the transmitter UEs. In some aspects, if the transmitter UEs are served by another BS, the BS and/or the transmitter UEs may forward the indication of the one or more reception parameters of the receiver UE to the other B S, and the BS and the other BS may coordinate the transmission of the downlink streams, the sidelink streams, and/or the corresponding DMRS transmissions. In some aspects, if the transmitter UEs are operating in an autonomous mode (e.g., a mode in which the transmitter UEs autonomously schedule sidelink communications from a configured pool of time-frequency resources) and/or are out of coverage of a serving BS, the transmitter UEs may coordinate the transmission of the sidelink streams and/or the corresponding DMRS transmissions among the transmitter UEs.

In some aspects, the one or more reception parameters of the receiver UE may include a time-frequency alignment parameter that identifies whether transmission time interval (TTI) durations of the sidelink streams are to at least partially or fully align in the time domain, whether TTI durations of the downlink streams are to at least partially or fully align in the time domain, and/or whether the TTI durations of the sidelink streams are to at least partially or fully align in the time domain with the TTI durations of the downlink streams.

The reception capabilities of the receiver UE may include an automatic gain control (AGC) settling time associated with an ADC (e.g., ADC 360) of a receive chain of the receiver UE. The AGC setting time may be a time duration that the ADC takes to converge a gain of the ADC to a gain setpoint for converting analog baseband signals into digital baseband signals. If the ADC converts the analog baseband signals into digital baseband signals before the gain of the ADC has settled at the gain setpoint, the resulting digital baseband signals may be saturated (e.g., due to the gain of the ADC being too high relative to the gain setpoint) or may be noisy (e.g., due to the gain of the ADC being too low relative to the gain setpoint).

If the TTI durations of the sidelink streams and/or the downlink streams are not aligned, the gain setting of the ADC of the receiver UE may change, because the receiver UE may receive different quantities of streams at different times. If, because of the AGC settling time of the receiver UE, the ADC of the receiver UE is not capable of supporting the changes in the gain setting due to the TTI durations of the sidelink streams and/or the downlink streams are not aligned, the receiver UE may configure the one or more reception parameters to indicate that the TTI durations of sidelink streams and/or downlink streams transmitted to the receiver UE are to be aligned.

In addition, reception capabilities of the receiver UE may include a channel estimation capability of the receiver UE. The channel estimation capability of the UE may include the capability of the receiver UE to process a plurality of DMRS transmissions for the same stream. In some cases, if the transmissions of a plurality of streams partially overlap (e.g., in frequency, time, spatially, and/or the like), the transmission of each stream may experience a change in power between the overlapping portions and the non-overlapping portions. The changes in power due to the partial overlap may cause a phase discontinuity between the overlapping portions and the non-overlapping portions. Accordingly, the transmitter of a partially overlapped stream may transmit a separate DMRS for each portion (e.g., a DMRS for each overlapping portion and a DMRS for each non-overlapping portion). Thus, if the receiver UE is unable to process a plurality of DMRSs for the same stream, the receiver UE may configure the one or more reception parameters to indicate that the TTI durations of sidelink streams and/or downlink streams transmitted to the receiver UE are to be aligned such that a single DMRS is transmitted for each stream.

In some aspects, the one or more reception parameters of the receiver UE may include a time-frequency alignment parameter that identifies whether respective DMRS transmissions associated with sidelink streams transmitted to the receiver UE are to align in the time domain and/or frequency domain (e.g., are to be transmitted in the same symbol and/or same resource elements, are to have the same TTI durations, and/or the like), whether respective DMRS transmissions of downlink streams transmitted to the receiver UE are to align in the time domain and/or frequency domain, whether the respective DMRSs of the sidelink streams are to align with the respective DMRSs of the downlink streams in the time domain and/or frequency domain, whether the respective DMRSs of the sidelink streams and the respective DMRSs of the downlink streams are to be transmitted in an orthogonal manner (e.g., orthogonalized in time, frequency, and/or code-space), and/or the like.

As shown in FIG. 6B, and by reference number 604, the receiver UE may receive one or more downlink streams from the BS, one or more downlink DMRS transmissions associated with the one or more downlink streams from the BS, one or more sidelink streams from the transmitter UEs, one or more sidelink DMRS transmissions associated with the one or more sidelink streams from the transmitter UEs, and/or the like. In some aspects, the one or more downlink streams, the one or more downlink DMRS transmissions, the one or more sidelink streams, and/or the one or more sidelink DMRS transmissions may be based at least in part on the one or more reception parameters.

For example, the BS may transmit the one or more downlink streams such that the TTI durations of the one or more downlink streams are aligned (e.g., at least partially or fully overlap in the time domain), the transmitter UEs may transmit the one or more sidelink streams such that TTI durations of the one or more sidelink streams are aligned, the BS and the transmitter UEs may respectively transmit the one or more downlink streams and the one or more sidelink streams such that the TTI durations of the one or more sidelink streams are aligned with the TTI durations of the one or more downlink streams, and/or the like.

As another example, the BS may transmit the one or more downlink DMRS transmissions such that the TTI durations of the one or more downlink DMRS transmissions are aligned (e.g., at least partially or fully overlap in the time domain), the transmitter UEs may transmit the one or more sidelink DMRS transmissions such that TTI durations of the one or more sidelink DMRS transmissions are aligned, the BS and the transmitter UEs may respectively transmit the one or more downlink streams and the one or more sidelink streams such that the TTI durations of the one or more sidelink streams are aligned with the TTI durations of the one or more downlink streams, and/or the like.

As another example, the BS may transmit the one or more downlink DMRS transmissions such that the one or more downlink DMRS transmissions are orthogonal (e.g., orthogonalized in time, frequency, and/or code-space), the transmitter UEs may transmit the one or more sidelink DMRS transmissions such that TTI durations of the one or more sidelink DMRS transmissions are orthogonal, the BS and the transmitter UEs may respectively transmit the one or more downlink streams and the one or more sidelink streams such that the TTI durations of the one or more sidelink streams are orthogonal with the TTI durations of the one or more downlink streams, and/or the like.

In this way, the receiver UE may transmit, to the BS and/or the one or more transmitter UEs, an indication of one or more reception parameters of the receiver UE. The one or more reception parameters may be based at least in part on the receiver UE's reception capabilities. In this way, the BS and the transmitter UEs are aware of the receiver UE's reception capabilities and may schedule or coordinate the transmission of streams to the receiver UE in a way that is supported by the receiver UE's reception capabilities. This reduces the likelihood that the receiver UE will drop certain streams, reduces delays in receiving certain streams, increases wireless network capacity (e.g., by permitting a plurality of streams to be multiplexed and transmitted to the receiver UE), and/or the like.

As indicated above, FIGS. 6A and 6B are provided as one or more examples. Other examples may differ from what is described with respect to FIGS. 6A and 6B.

Figure 7A:
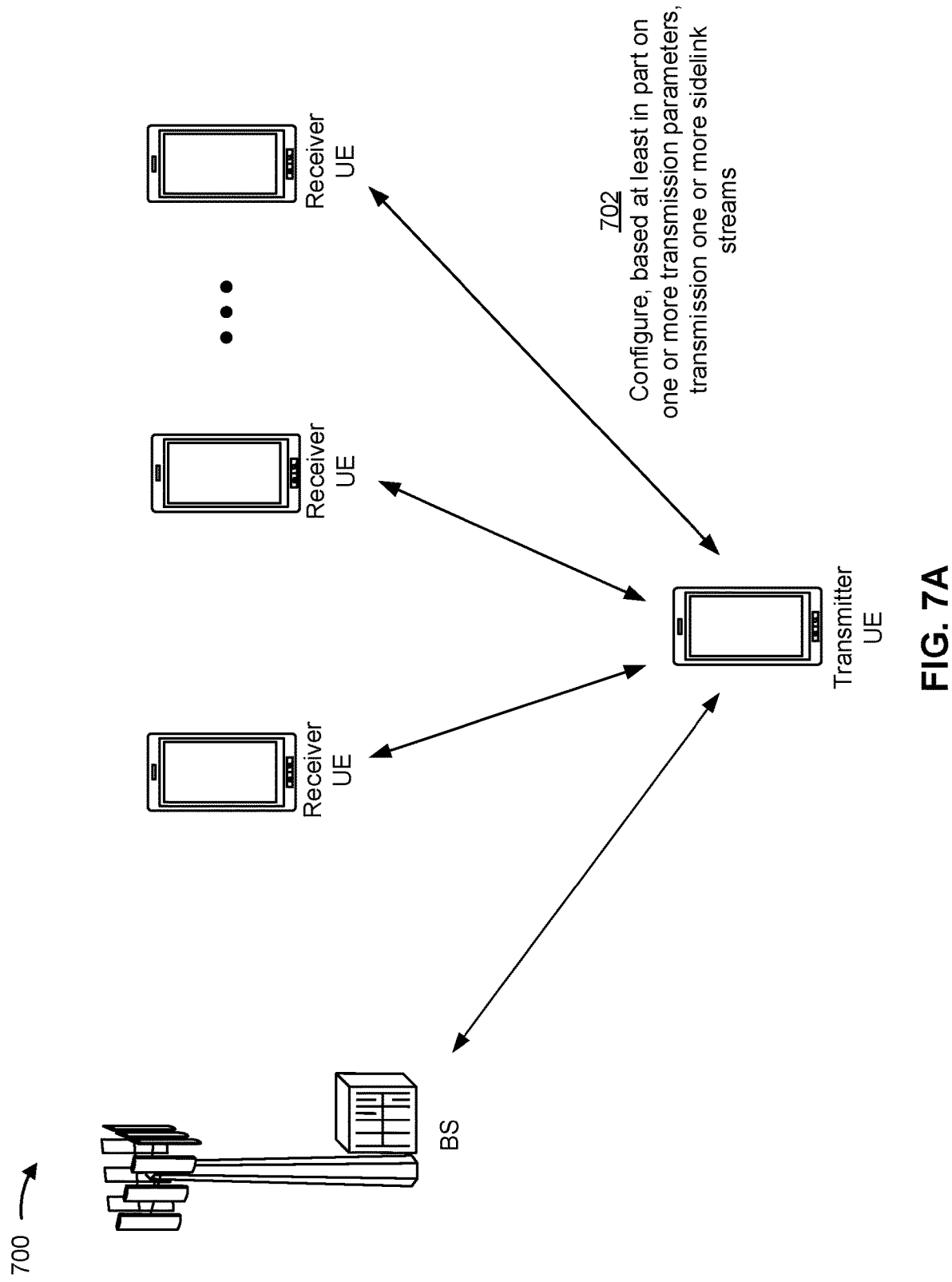
Figure 7B:
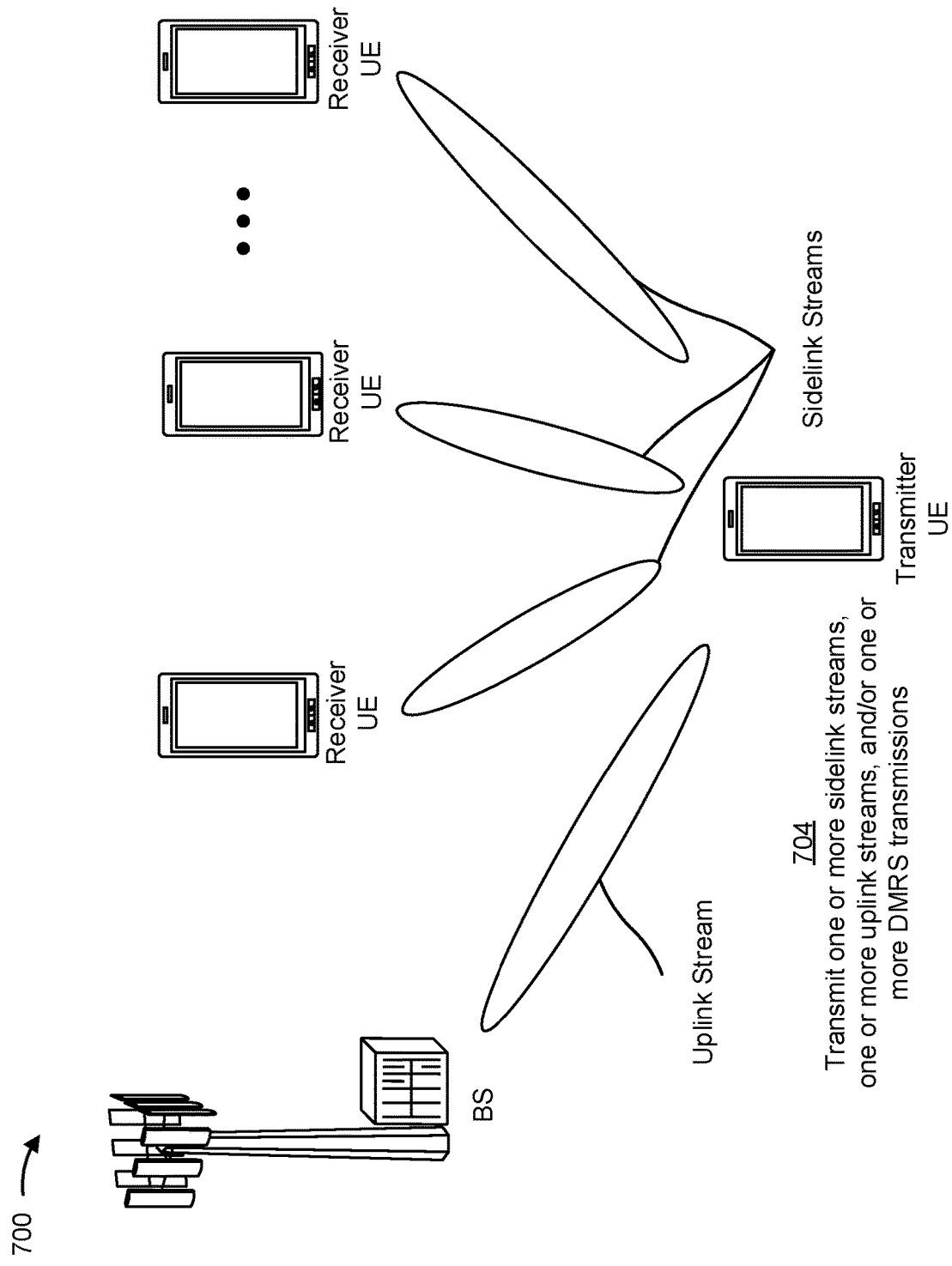

FIGS. 7A and 7B are diagrams illustrating one or more examples 700 of sidelink MU-MIMO, in accordance with various aspects of the present disclosure. As shown in FIGS. 7A and 7B, examples 700 may include sidelink communication on a sidelink between a plurality of UEs (e.g., UEs 120), such as a transmitter UE and one or more receiver UEs, and/or uplink communication on an access link between the transmitter UE and a BS (e.g., BS 110). In some aspects, a greater quantity of UEs and/or BSs may be included in examples 700.

In some aspects, the BS and the UEs may be included in a wireless network, such as wireless network 100 and/or another wireless network. In some aspects, the BS may be a serving BS of the transmitter UE in the wireless network. The BS and the transmitter UE may communicate via an access link, which may be configured with a frame structure (e.g., frame structure 400 and/or another frame structure), a slot format (e.g., slot format 510 and/or another slot format), and/or the like. The access link may include an uplink and a downlink. In some aspects, the UEs may be subordinate entities included in the wireless network and may communicate via a sidelink. In some aspects, the sidelink may be configured with a frame structure (e.g., frame structure 400 and/or another frame structure), a slot format (e.g., slot format 510 and/or another slot format), and/or the like.

In some aspects, the UEs and/or the BS may be capable of performing communications in the wireless network. For example, the BS may be capable of transmitting one or more downlink streams (e.g., one or more downlink MU-MIMO streams) to the transmitter UE and/or other UEs, the receiver UEs may be capable of transmitting sidelink communications to the transmitter UE and/or other UEs, the transmitter UE may be capable of transmitting one or more uplink streams (e.g., one or more uplink MU-MIMO streams) to the BS and/or other BSs, the transmitter UE may be capable of transmitting one or more sidelink streams (e.g., one or more sidelink MU-MIMO streams) to the receiver UEs and/or other UEs, and/or the like. As another example, the BS may be capable of receiving one or more uplink streams from the transmitter UE and/or other UEs, the receiver UEs may be capable of receiving sidelink communications from the transmitter UE and/or other UEs, the transmitter UE may be capable of receiving one or more downlink streams from the BS and/or other BSs, the transmitter UE may be capable of receiving one or more sidelink streams from the receiver UEs and/or other UEs, and/or the like.

In some aspects, the transmitter UE may be configured with transmission capabilities. The transmission capabilities of the transmitter UE may be based at least in part on a hardware configuration of the transmitter UE, a software and/or firmware configuration of the transmitter UE, a network configuration or subscription of the transmitter UE in the wireless network, and/or the like. The transmission capabilities of the transmitter UE may determine the transmitter UE's capability to transmit uplink streams to the BS and/or other BSs, the transmitter UE's capability to transmit sidelink streams to the receiver UEs and/or other UEs, and/or the like. Moreover, the MIMO transmission capabilities of the transmitter UE may determine the transmitter UEs capability to transmit DMRS transmissions associated with the uplink streams and/or the sidelink streams.

As shown in FIG. 7A, and by reference number 702, to configure the transmission of uplink streams, sidelink streams, and/or corresponding DMRS transmissions, the transmitter UE may transmit an indication of the one or more transmission parameters of the transmitter UE. The one or more transmission parameters may be one or more MU-MIMO transmission parameters. The one or more transmission parameters may be based at least in part on the transmission capabilities of the transmitter UE. In some aspects, the transmitter UE may transmit the indication of the one or more transmission parameters to the BS and/or to the receiver UEs. In this way, the BS may coordinate the transmission of the uplink streams and corresponding DMRS transmissions, the transmitter UE, the BS, and/or the receiver UEs may coordinate and configure the transmission of the sidelink streams and corresponding DMRS transmissions, and/or the like based at least in part on the one or more transmission parameters. In this way, the transmission of the uplink streams, the sidelink streams, and/or the corresponding DMRS transmissions are supported by the transmission capabilities of the transmitter UE.

In some aspects, if the BS functions as a serving BS for the receiver UEs, and the receiver UEs are operating in a scheduled mode (e.g., the BS schedules sidelink transmissions for the receiver UEs), the BS and/or the transmitter UE may schedule the transmission of the sidelink streams and/or the corresponding DMRS transmissions. In some aspects, if the receiver UEs are served by another BS, the BS and/or the receiver UEs may forward the indication of the one or more transmission parameters of the transmitter UE to the other BS, and the BS and the other BS may coordinate the transmission of the sidelink streams and/or the corresponding DMRS transmissions. In some aspects, if the receiver UEs are operating in an autonomous mode (e.g., a mode in which the receiver UEs autonomously schedule sidelink communications from a configured pool of time-frequency resources) and/or are out of coverage of a serving BS, the receiver UEs and the transmitter UE may coordinate the transmission of the sidelink streams and/or the corresponding DMRS transmissions.

In some aspects, the one or more transmission parameters of the transmitter UE may include a frequency mapping parameter that identifies whether a transmission of simultaneous streams (e.g., simultaneous sidelink streams, simultaneous uplink streams, simultaneous sidelink and uplink streams, and/or the like) are to be contiguous in the frequency domain (e.g., are to occupy contiguous subcarriers). The frequency mapping parameter may be based at least in part on a peak-to-average power ratio (PAPR) capability of one or more transmit chains of the transmitter UE. Non-contiguous (e.g., in the frequency domain) transmissions passing through the same amplifier (e.g., amplifier 312, 316, and/or the like) may experience intermodulation distortion, which may increase PAPR of the transmissions. Accordingly, the BS and/or the transmitter UE may configure the transmission of simultaneous streams such that the combined transmit power of the simultaneous streams does not exceed the PAPR capability of the transmit chains of the transmitter UE.

In some aspects, the one or more transmission parameters of the transmitter UE may include a parameter that identifies a quantity of antenna panels or arrays of the transmitter UE. The transmitter UE may configure the transmission of the sidelink streams and/or the corresponding DMRS transmissions based at least in part on the quantity of antenna panels or arrays of the transmitter UE that are available to transmit the sidelink streams and/or the corresponding DMRS transmissions. For example, the transmitter UE may determine, based at least in part on the quantity of antenna panels or arrays of the transmitter UE, the quantity of multiplexed sidelink streams (e.g., in the time domain, frequency domain, spatial domain, and/or the like) that may be transmitted across each antenna panel or array.

In some aspects, the transmitter UE may coordinate and/or configure the transmission of the uplink streams and/or the corresponding DMRS transmissions by transmitting a scheduling indication of the sidelink streams and/or corresponding DMRS transmissions to the BS. In this way, the BS is aware of the scheduling of the sidelink streams and/or corresponding DMRS transmissions, and may provide a scheduling grant for the uplink streams and/or the corresponding DMRS transmissions that is based at least in part on the scheduling indication of the sidelink streams and/or corresponding DMRS transmissions and the one or more transmission parameters.

Additionally and/or alternatively, the transmitter UE may coordinate and/or configure the transmission of the sidelink streams and/or the corresponding DMRS transmissions by transmitting a scheduling indication of the uplink streams and/or corresponding DMRS transmissions to the BS, the serving BS of the receiver UEs, and/or to the receiver UEs. In this way, the BS, the serving BS of the receiver UEs, and/or the receiver UEs are aware of the scheduling of the uplink streams and/or corresponding DMRS transmissions, and may coordinate the transmission of the sidelink streams and/or the corresponding DMRS transmissions based at least in part on the scheduling indication of the uplink streams and/or corresponding DMRS transmissions and the one or more transmission parameters.

In some aspects, the transmitter UE may coordinate and/or configure the transmission of the uplink streams and/or the corresponding DMRS transmissions based at least in part on a reception parameter associated with the receiver UEs. The transmitter UE may receive an indication of the reception for each receiver UE from the BS and/or from each receiver UE. In some aspects, the BS may receive the indication of the reception for each receiver UE from the serving BS of each receiver UE. The reception parameter for a receiver UE may identify a capability of the receiver UE to process a plurality of DMRS transmissions for a stream.

As indicated above, if the transmissions of a plurality of streams partially overlap (e.g., in frequency, spatially, and/or the like), the transmission of each stream may experience a change in power between the overlapping portions and the non-overlapping portions. The changes in power due to the partial overlap may cause a phase discontinuity between the overlapping portions and the non-overlapping portions. Accordingly, the transmitter of a partially overlapped stream may transmit a separate DMRS for each portion (e.g., a DMRS for each overlapping portion and a DMRS for each non-overlapping portion). Thus, if a receiver UE is unable to process a plurality of DMRSs for the same stream, the receiver UE may configure the associated reception parameter to indicate that the sidelink stream, to be transmitted to the receiver UE, is to be scheduled such that a single DMRS is transmitted for the sidelink stream.

As shown in FIG. 7B, and by reference number 704, the transmitter UE may transmit one or more uplink streams to the BS, one or more uplink DMRS transmissions associated with the one or more uplink streams to the BS, one or more sidelink streams to the receiver UEs, one or more sidelink DMRS transmissions associated with the one or more sidelink streams to the transmitter UEs, and/or the like. In some aspects, the one or more uplink streams, the one or more uplink DMRS transmissions, the one or more sidelink streams, and/or the one or more sidelink DMRS transmissions may be based at least in part on the one or more transmission parameters.

For example, the transmitter UE may transmit the one or more uplink streams and/or the one or more sidelink streams such that the transmission of the one or more uplink streams and/or the one or more sidelink streams satisfies the one or more transmission parameters of the UE and/or the reception parameters of the receiver UEs. As another example, the transmitter UE may transmit the one or more uplink DMRS transmissions and/or the one or more sidelink DMRS transmissions such that the transmission of the one or more uplink DMRS transmissions and/or the one or more sidelink DMRS transmissions satisfies the one or more transmission parameters of the UE and/or the reception parameters of the receiver UEs.

In this way, the transmitter UE may configure the transmission of one or more sidelink streams by coordinating the one or more sidelink streams with the BS and/or the receiver UEs based at least in part on one or more transmission parameters of the UE. The one or more transmission parameters may be based at least in part on the transmitter UE's reception capabilities. In this way, the BS and the receiver UEs are aware of the transmitter UE's transmission capabilities such that the BS may schedule or coordinate the transmission of uplink streams, and the transmitter UE may configure the transmission of sidelink streams, in a way that is supported by the transmitter UE's transmission capabilities. This reduces the likelihood that certain streams will not be transmitted, reduces delays in transmitting certain streams, increases wireless network capacity (e.g., by permitting a plurality of streams to be multiplexed and transmitted by the transmitter UE), and/or the like.

As indicated above, FIGS. 7A and 7B are provided as one or more examples. Other examples may differ from what is described with respect to FIGS. 7A and 7B. For example, in some cases UEs and/or gNBs may be equipped with full-duplex capability, which may also be governed by limits on the rank (for example, the number of streams) that can be processed on both transmit and receive links simultaneously (as in full-duplex operation), the extent of their overlap or non-overlap in TTI duration, DMRS, and/or the like. Such capabilities may also be exchanged as described above, either directly between sidelink UEs or via serving base stations if configured.

Figure 8:
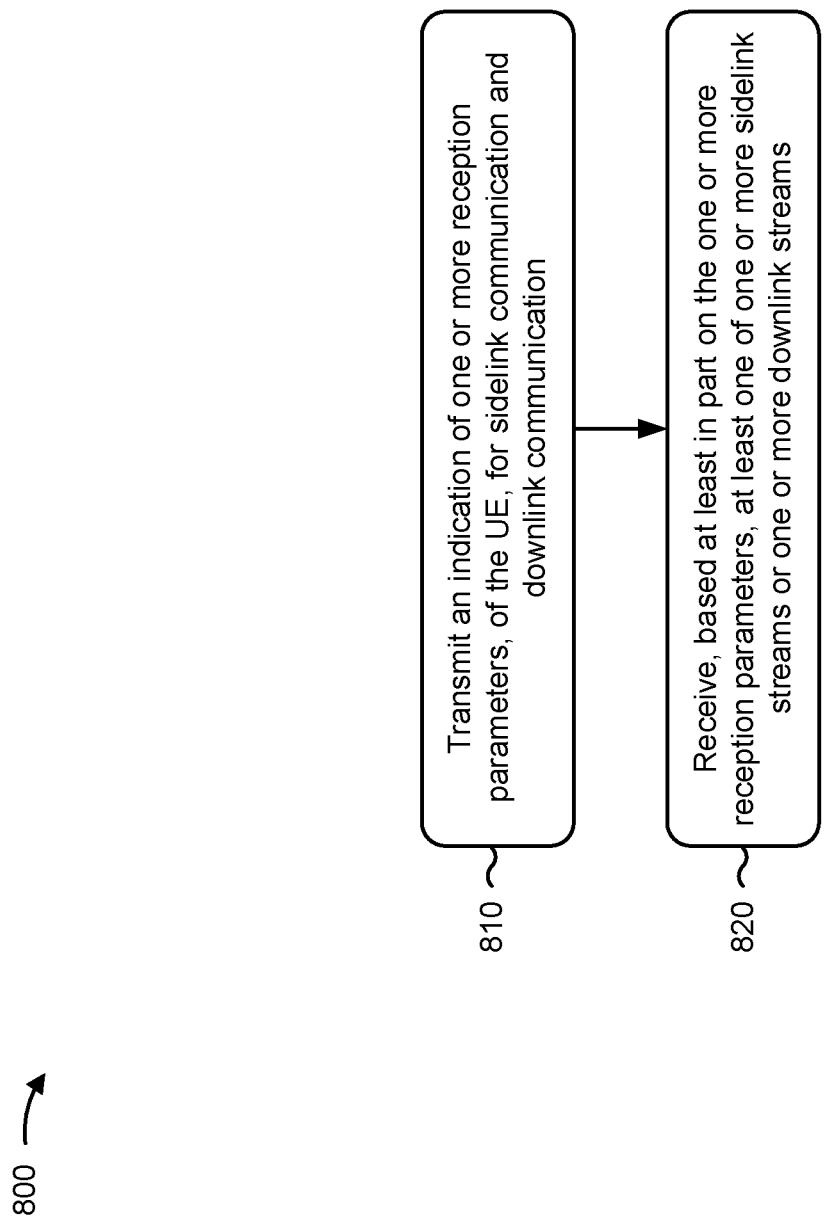
FIGS. 8 and 9 are diagrams illustrating example processes performed, for example, by a UE, in accordance with various aspects of the present disclosure.

FIG. 8 is a diagram illustrating an example process 800 performed, for example, by a UE, in accordance with various aspects of the present disclosure. Example process 800 is an example where a UE (e.g., UE 120 and/or the like) performs operations associated with sidelink MU-MIMO.

As shown in FIG. 8, in some aspects, process 800 may include transmitting an indication of one or more reception parameters, of the UE, for sidelink communication and downlink communication (block 810). For example, the UE (e.g., using receive processor 258, transmit processor 264, controller/processor 280, memory 282, modem 302, antenna element 320, amplifier 312 and/or 316, beamforming manager 334, and/or the like) may transmit an indication of one or more reception parameters, of the UE, for sidelink communication and downlink communication, as described above.

As further shown in FIG. 8, in some aspects, process 800 may include receiving, based at least in part on the one or more reception parameters, at least one of one or more sidelink streams or one or more downlink streams (block 820). For example, the UE (e.g., using receive processor 258, transmit processor 264, controller/processor 280, memory 282, modem 302, antenna element 320, amplifier 344 and/or 348, beamforming manager 334, and/or the like) may receive, based at least in part on the one or more reception parameters, at least one of one or more sidelink streams or one or more downlink streams, as described above.

Process 800 may include additional aspects, such as any single aspect or any combination of aspects described below and/or in connection with one or more other processes described elsewhere herein.

In a first aspect, the one or more reception parameters indicate a time-frequency alignment for one or more streams associated with the UE. In a second aspect, alone or in combination with the first aspect, the one or more streams include at least one of the one or more sidelink streams or the one or more downlink streams.

In a third aspect, alone or in combination with one or more of the first and second aspects, the time-frequency alignment identifies at least one of whether TTI durations of the one or more sidelink streams are to at least partially align, whether TTI durations of the one or more downlink streams are to at least partially align, whether the TTI durations of the one or more sidelink streams are to at least partially align with the TTI durations of the one or more downlink streams, whether respective demodulation reference signals (DMRSs) of the one of one or more sidelink streams are to align, whether respective DMRSs of the one of one or more downlink streams are to align, or whether the respective DMRSs of the one of one or more sidelink streams are to align with the respective DMRSs of the one of one or more downlink streams.

In a fourth aspect, alone or in combination with one or more of the first through third aspects, transmitting the indication of one or more reception parameters comprises transmitting the indication of one or more reception parameters to at least one of a serving base station of the UE or one or more other UEs that are to transmit the one or more sidelink streams to the UE.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
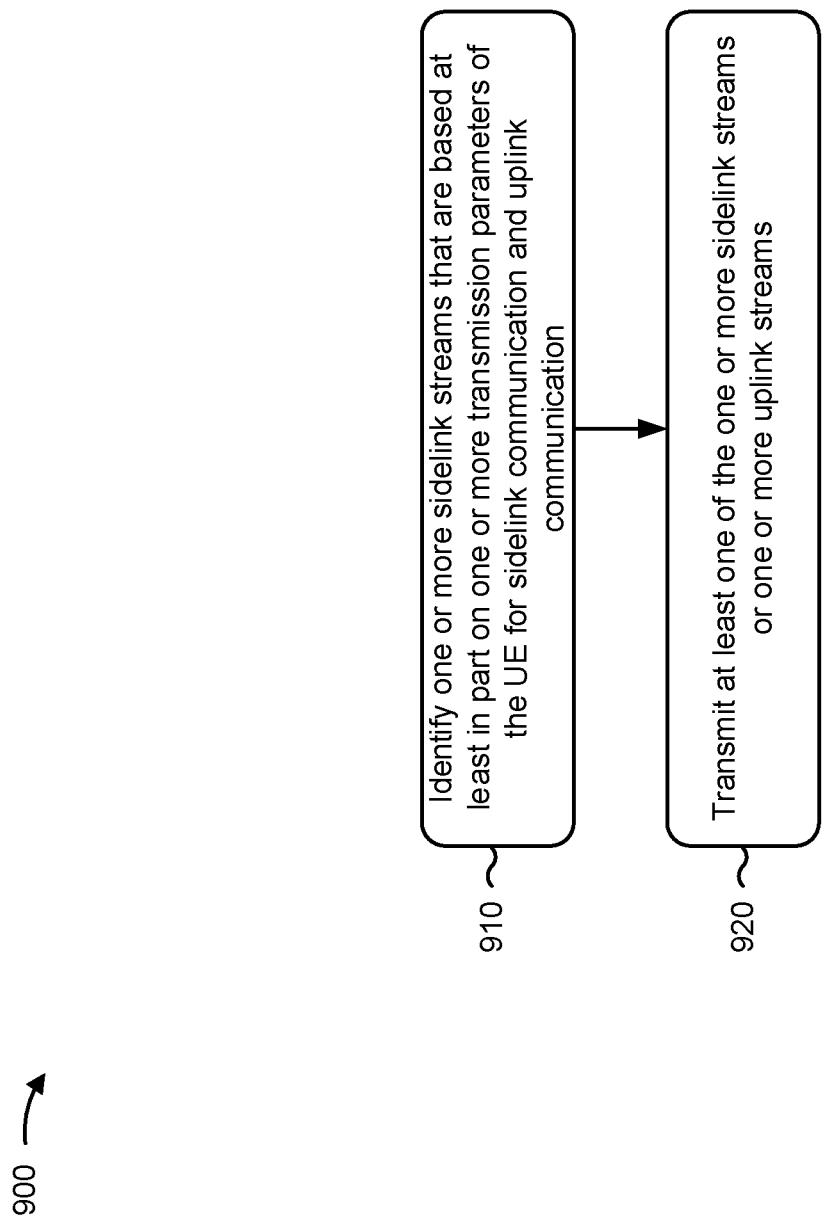

FIG. 9 is a diagram illustrating an example process 900 performed, for example, by a UE, in accordance with various aspects of the present disclosure. Example process 900 is an example where a UE (e.g., UE 120 and/or the like) performs operations associated with sidelink MU-MIMO.

As shown in FIG. 9, in some aspects, process 900 may include identifying one or more sidelink streams that are based at least in part on one or more transmission parameters of the UE for sidelink communication and uplink communication (block 910). For example, the UE (e.g., using receive processor 258, transmit processor 264, controller/processor 280, memory 282, modem 302, antenna element 320, amplifier 312, 316, 344, and/or 348, beamforming manager 334, and/or the like) may identify one or more sidelink streams that are based at least in part on one or more transmission parameters of the UE for sidelink communication and uplink communication, as described above.

As further shown in FIG. 9, in some aspects, process 900 may include transmitting at least one of the one or more sidelink streams or one or more uplink streams (block 920). For example, the UE (e.g., using receive processor 258, transmit processor 264, controller/processor 280, memory 282, modem 302, antenna element 320, amplifier 312 and/or 316, beamforming manager 334, and/or the like) may transmit at least one of the one or more sidelink streams or one or more uplink streams, as described above.

Process 900 may include additional aspects, such as any single aspect or any combination of aspects described below and/or in connection with one or more other processes described elsewhere herein.

In a first aspect, the one or more transmission parameters include a parameter that identifies a quantity of antenna panels or arrays, of the UE, that are available to transmit at least one of the one or more sidelink streams or the one or more uplink streams. In a second aspect, alone or in combination with the first aspect, process 900 further comprises configuring transmission of respective transmissions for the one or more sidelink streams based at least in part on the one or more transmission parameters of the UE and a reception parameter associated with one or more other UEs that are to receive the one or more sidelink streams.

In a third aspect, alone or in combination with one or more of the first and second aspects, the reception parameter associated with the one or more other UEs identifies a respective capability, of each UE of the one or more other UEs, to process a plurality of DMRS transmissions for a sidelink stream of the one or more sidelink streams. In a fourth aspect, alone or in combination with one or more of the first through third aspects, process 900 further comprises transmitting the respective transmissions based at least in part on configuring the transmission of the respective transmissions for the one or more sidelink streams, and the respective transmissions comprise respective DMRS transmissions.

In a fifth aspect, alone or in combination with one or more of the first through fourth aspects, process 900 further comprises receiving an indication of the reception parameter associated with one or more other UEs from at least one of a serving base station of the UE or the one or more other UEs. In a sixth aspect, alone or in combination with one or more of the first through fifth aspects, process 900 includes configuring the one or more sidelink streams based at least in part on the one or more transmission parameters, and configuring the transmission of the one or more sidelink streams comprises transmitting a scheduling indication of the one or more sidelink streams to a serving base station of the UE that is to receive the one or more uplink streams.

In a seventh aspect, alone or in combination with one or more of the first through sixth aspects, process 900 includes configuring the one or more sidelink streams based at least in part on the one or more transmission parameters, and configuring transmission of the one or more sidelink streams includes configuring transmission of the one or more sidelink streams based at least in part on a quantity of multiplexed sidelink streams that the UE is capable of transmitting across one or more antenna panels or arrays of the UE. In an eighth aspect, alone or in combination with one or more of the first through seventh aspects, process 900 further comprises determining the quantity of multiplexed sidelink streams that the UE is capable of transmitting across the one or more antenna panels or arrays based at least in part on a parameter, included in the one or more transmission parameters, that identifies a quantity of antenna panels or arrays of the UE.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising
    transmitting an indication of one or more multi-user multiple-input multiple-output (MU-MIMO) reception parameters, of the UE, for sidelink communication and downlink communication; and
    receiving, based at least in part on the one or more MU-MIMO reception parameters, at least one of one or more sidelink streams or one or more downlink streams,
        wherein at least one of:
            the one or more MU-MIMO reception parameters indicate a time-frequency alignment identifying at least one of:
                whether transmission time interval (TTI) durations of the one or more sidelink streams are to at least partially align,
                whether TTI durations of the one or more downlink streams are to at least partially align,
                whether the TTI durations of the one or more sidelink streams are to at least partially align with the TTI durations of the one or more downlink streams,
                whether respective demodulation reference signals (DMRSs) of the one or more sidelink streams are to align,
                whether respective DMRSs of one or more downlink streams are to align, or
                whether the respective DMRSs of the one or more sidelink streams are to align with the respective DMRSs of the one or more downlink streams, or
            transmitting the indication of the one or more MU-MIMO reception parameters comprises:
                transmitting the indication of the one or more MU-MIMO reception parameters to a serving wireless node of the UE.

2. The method of claim 1, wherein the one or more MU-MIMO reception parameters indicate the time-frequency alignment for at least one of:
    the one or more sidelink streams, or
    the one or more downlink streams.

3. The method of claim 1, wherein the time-frequency alignment identifies at least one of:
whether the TTI durations of the one or more sidelink streams are to at least partially align,
whether the TTI durations of the one or more downlink streams are to at least partially align, or
whether the TTI durations of the one or more sidelink streams are to at least partially align with the TTI durations of the one or more downlink streams.

4. The method of claim 1, wherein the time-frequency alignment identifies at least one of:
whether the respective DMRSs of the one or more sidelink streams are to align,
whether the respective DMRSs of the one or more downlink streams are to align, or
whether the respective DMRSs of the one or more sidelink streams are to align with the respective DMRSs of the one or more downlink streams.

5. The method of claim 1, wherein transmitting the indication of the one or more MU-MIMO reception parameters comprises:
transmitting the indication of the one or more MU-MIMO reception parameters to at least one of the serving wireless node of the UE or one or more other UEs that are to transmit the one or more sidelink streams to the UE.

6. A method of wireless communication performed by a user equipment (UE), comprising:
identifying one or more sidelink streams or one or more uplink streams that are based at least in part on one or more multi-user multiple-input multiple-output (MU-MIMO) transmission parameters of the UE for sidelink communication and uplink communication;
configuring transmission of a respective demodulation reference signal (DMRS) transmissions for the one or more sidelink streams based at least in part on the one or more MU-MIMO transmission parameters of the UE; and
transmitting the respective DMRS transmissions of the one or more sidelink streams based at least in part on configuring the transmission of the respective DMRS transmissions.

7. The method of claim 6, wherein the one or more MU-MIMO transmission parameters include a parameter that identifies a quantity of antenna panels or arrays, of the UE, that are available to transmit at least one of the one or more sidelink streams or the one or more uplink streams.

8. The method of claim 6, wherein configuring the transmission of the respective DMRS transmissions for the one or more sidelink streams comprises:
configuring the transmission of the respective DMRS transmissions for the one or more sidelink streams based at least in part on the one or more MU-MIMO transmission parameters of the UE and a reception parameter associated with one or more other UEs that are to receive the one or more sidelink streams.

9. The method of claim 8, wherein the reception parameter associated with the one or more other UEs identifies a respective capability, of each UE of the one or more other UEs, to process the respective DMRS transmissions for the one or more sidelink streams.

10. The method of claim 8, further comprising:
receiving an indication of the reception parameter associated with one or more other UEs from at least one of a serving wireless node of the UE or the one or more other UEs.

11. The method of claim 6, further comprising:
transmitting a scheduling indication of the one or more sidelink streams to a serving wireless node of the UE that is to receive the one or more uplink streams.

12. The method of claim 6, wherein configuring the transmission of the respective DMRS transmissions for the one or more sidelink streams comprises:
configuring the transmission of the respective DMRS transmissions for the one or more sidelink streams based at least in part on the one or more MU-MIMO transmission parameters of the UE and a quantity of multiplexed sidelink streams that the UE is capable of transmitting across one or more antenna panels or arrays of the UE.

13. The method of claim 12, further comprising:
determining the quantity of multiplexed sidelink streams that the UE is capable of transmitting across the one or more antenna panels or arrays based at least in part on a parameter, included in the one or more MU-MIMO transmission parameters, that identifies a quantity of antenna panels or arrays of the UE.

14. The method of claim 8, wherein the reception parameter associated with the one or more other UEs includes an automatic gain control (AGC) settling time associated with an analog to digital converter (ADC) of a receive chain of each UE of the one or more other UEs.

15. The method of claim 14, wherein the AGC setting time comprises a time duration that the ADC takes to converge a gain of the ADC to a gain setpoint for converting analog baseband signals into digital baseband signals.

16. A user equipment (UE) for wireless communication, comprising:
a memory; and
one or more processors coupled to the memory, the one or more processors configured to:
transmit an indication of one or more multi-user multiple-input multiple-output (MU-MIMO) reception parameters, of the UE, for sidelink communication and downlink communication; and
receive, based at least in part on the one or more MU-MIMO reception parameters, at least one of one or more sidelink streams or one or more downlink streams,
wherein at least one of:
the one or more MU-MIMO reception parameters indicate a time-frequency alignment identifying at least one of:
whether transmission time interval (TTI) durations of the one or more sidelink streams are to at least partially align,
whether TTI durations of the one or more downlink streams are to at least partially align,
whether the TTI durations of the one or more sidelink streams are to at least partially align with the TTI durations of the one or more downlink streams,
whether respective demodulation reference signals (DMRSs) of the one or more sidelink streams are to align,
whether respective DMRSs of the one or more downlink streams are to align, or
whether the respective DMRSs of the one or more sidelink streams are to align with the respective DMRSs of the one or more downlink streams, or
the one or more processors, to transmit the indication of the one or more MU-MIMO reception parameters, are configured to:

transmit the indication of the one or more MU-MIMO reception parameters to a serving wireless node of the UE.

17. The UE of claim 16, wherein the one or more MU-MIMO reception parameters indicate the time-frequency alignment for at least one of:
the one or more sidelink streams, or
the one or more downlink streams.

18. The UE of claim 16, wherein the time-frequency alignment identifies at least one of:
whether the TTI durations of the one or more sidelink streams are to at least partially align,
whether the TTI durations of the one or more downlink streams are to at least partially align, or
whether the TTI durations of the one or more sidelink streams are to at least partially align with the TTI durations of the one or more downlink streams.

19. The UE of claim 16, wherein the time-frequency alignment identifies at least one of:
whether the respective DMRSs of the one or more sidelink streams are to align,
whether the respective DMRSs of the one or more downlink streams are to align, or
whether the respective DMRSs of the one or more sidelink streams are to align with the respective DMRSs of the one or more downlink streams.

20. The UE of claim 16, wherein the one or more processors, when transmitting the indication of the one or more MU-MIMO reception parameters, are to:
transmit the indication of the one or more MU-MIMO reception parameters to at least one of the serving wireless node of the UE or one or more other UEs that are to transmit the one or more sidelink streams to the UE.

21. A user equipment (UE) for wireless communication, comprising:
a memory; and
one or more processors coupled to the memory, the one or more processors configured to:
identify one or more sidelink streams based at least in part on one or more multi-user multiple-input multiple-output (MU-MIMO) transmission parameters of the UE for sidelink communication and uplink communication;
configure transmission of a respective demodulation reference signal (DMRS) transmissions for the one or more sidelink streams based at least in part on the one or more MU-MIMO transmission parameters of the UE; and
transmit the respective DMRS transmissions based at least in part on configuring the transmission of the respective DMRS transmissions.

22. The UE of claim 21, wherein the one or more MU-MIMO transmission parameters include a parameter that identifies a quantity of antenna panels or arrays, of the UE, that are available to transmit at least one of the one or more sidelink streams or the one or more uplink streams.

23. The UE of claim 21, wherein the one or more processors, to configure the transmission of the respective DMRS transmissions for the one or more sidelink streams, are configured to:
configure the transmission of the respective DMRS transmissions for the one or more sidelink streams based at least in part on the one or more MU-MIMO transmission parameters of the UE and a reception parameter associated with one or more other UEs that are to receive the one or more sidelink streams.

24. The UE of claim 23, wherein the reception parameter associated with the one or more other UEs identifies a respective capability, of each UE of the one or more other UEs, to process the respective DMRS transmissions for the one or more sidelink streams.

25. The UE of claim 23, wherein the one or more processors are further configured to:
receive an indication of the reception parameter associated with one or more other UEs from at least one of a serving wireless node of the UE or the one or more other UEs.

26. The UE of claim 21, wherein the one or more processors are further configured to:
transmit a scheduling indication of the one or more sidelink streams to a serving wireless node of the UE that is to receive the one or more uplink streams.

27. The UE of claim 21, wherein the one or more processors to configure the transmission of the respective DMRS transmissions for the one or more sidelink streams, are to:
configure the transmission of the respective DMRS transmissions for the one or more sidelink streams based at least in part on the one or more MU-MIMO transmission parameters of the UE and a quantity of multiplexed sidelink streams that the UE is capable of transmitting across one or more antenna panels or arrays of the UE.

28. The UE of claim 27, wherein the one or more processors are further configured to:
determine the quantity of multiplexed sidelink streams that the UE is capable of transmitting across the one or more antenna panels or arrays based at least in part on a parameter, included in the one or more MU-MIMO transmission parameters, that identifies a quantity of antenna panels or arrays of the UE.

29. The UE of claim 23, wherein the reception parameter associated with the one or more other UEs includes an automatic gain control (AGC) settling time associated with an analog to digital converter (ADC) of a receive chain of each UE of the one or more other UEs.

30. The UE of claim 29, wherein the AGC setting time comprises a time duration that the ADC takes to converge a gain of the ADC to a gain setpoint for converting analog baseband signals into digital baseband signals.

* * * * *